United States Patent
Antonini et al.

(10) Patent No.: US 9,442,630 B2
(45) Date of Patent: Sep. 13, 2016

(54) 3D INTERACTIVE MENU

(75) Inventors: Roberto Antonini, Turin (IT); Maurizio Belluati, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 187 days.

(21) Appl. No.: 13/976,775

(22) PCT Filed: Dec. 30, 2010

(86) PCT No.: PCT/EP2010/070931
§ 371 (c)(1),
(2), (4) Date: Jun. 27, 2013

(87) PCT Pub. No.: WO2012/089270
PCT Pub. Date: Jul. 5, 2012

(65) Prior Publication Data
US 2013/0275918 A1     Oct. 17, 2013

(51) Int. Cl.
*G06F 3/0482* (2013.01)
*G06F 3/0481* (2013.01)

(52) U.S. Cl.
CPC ......... *G06F 3/0482* (2013.01); *G06F 3/04815* (2013.01)

(58) Field of Classification Search
CPC ............. G06F 3/0482; G06F 3/04815; G06F 3/04817; H04L 41/12
See application file for complete search history.

(56) References Cited

U.S. PATENT DOCUMENTS

| | | | |
|---|---|---|---|
| 5,805,167 A * | 9/1998 | van Cruyningen | 715/808 |
| 5,898,435 A * | 4/1999 | Nagahara et al. | 715/841 |
| 6,448,987 B1 | 9/2002 | Easty et al. | |
| 7,137,075 B2 * | 11/2006 | Hoshino et al. | 715/848 |
| 8,291,322 B2 * | 10/2012 | Klappert et al. | 715/721 |
| 2009/0019397 A1 * | 1/2009 | Buffet et al. | 715/837 |
| 2011/0291945 A1 * | 12/2011 | Ewing et al. | 345/173 |
| 2012/0173977 A1 * | 7/2012 | Walker | G06F 3/0485 715/716 |

FOREIGN PATENT DOCUMENTS

| | | |
|---|---|---|
| EP | 0 309 041 | 10/1990 |
| GB | 2 440 197 | 1/2008 |
| WO | 2008 029180 | 3/2008 |

OTHER PUBLICATIONS

Internation Search Report Issued Apr. 5, 2011 in PCT/EP10/070931 Filed Dec. 30, 2010.

* cited by examiner

*Primary Examiner* — Anil N Kumar
(74) *Attorney, Agent, or Firm* — Oblon, McClelland, Maier & Neustadt, L.L.P.

(57) ABSTRACT

A method for navigating an interactive menu including a first number of selectable items in a virtual environment. The method includes: providing a grid on a delimited portion of a plane in the virtual environment, the grid including locations equal to the first number; providing plural navigation directions within the grid and arranging each menu item on a respective location of the grid according to an item-grid arrangement, adjacencies along the navigation directions among grid items determine corresponding adjacency relationships; determining adjacency relationships along the navigation directions among items located on borders of the delimited portions; shooting a first item in close-up, enabling its selection; receiving a navigation command identifying a navigation direction along which a second selectable item is located, and altering the item-grid arrangement to relocate the items in different grid locations based on the received navigation command to shoot the second item in close-up.

10 Claims, 24 Drawing Sheets

1300

3D INTERACTIVE MENU

BACKGROUND OF THE INVENTION

1. Field of the Invention

The present invention relates to the field of the graphical user interfaces, and more particularly to a method and a system for the on-screen displaying of items of a three-dimensional interactive menu.

2. Description of the Related Art

The ever increasing diffusion in the mass-market of digital interactive devices—such as digital television sets, media centers, smartphones, personal digital assistants, video game consoles and the like—has called for the development of simple and immediate Graphical User Interfaces (GUI) that can be exploited by the users for interacting with such devices in an intuitive way. Thanks to the graphical capabilities of the modern digital interactive devices, now it is possible to obtain an on-screen display of a three-dimensional (3D) menu formed by a plurality of items arranged within a 3D virtual environment. The selection of an item among those forming the menu is performed by "navigating" the 3D virtual environment through proper navigation commands, e.g., input through directional keys arranged on a remote control of the digital interactive device itself. For example, such navigation may be carried out according to a first person perspective view of the environment obtained through the virtual lens of a movable virtual camera; in this way, an item of the menu may be selected by moving—through the navigation commands—such virtual camera within the virtual environment until such item is in the close-up of the virtual camera.

The way the items forming the menu are arranged within the 3D virtual environment strongly influences the perceptive feelings of the user when he/she is interacting with the digital interactive device. In order to be sufficiently effective and reliable, a 3D menu of the abovementioned type has to be capable of displaying on-screen all the items forming the menu in a single view. Moreover, the items arrangement should be capable of making clearly visible the way each item can be reached through the navigation of the 3D virtual environment, i.e., it has to clearly show without ambiguity which are the specific directions to be selected for reaching a specific item.

3D menus of this type are also affected by a severe drawback that negatively influences the perceptive feelings of the users. Particularly, when the virtual camera is moving ahead within the 3D virtual environment during the navigation so as to approach a specific item of the menu, the items of the menu that are located in previous positions exit from the view of the virtual camera (being now located "behind" the virtual camera itself); in this situation, the user has the feeling that such items are no more reachable. Actually, such items may be reached by changing the viewpoint of the virtual camera (e.g., through a 180 degree rotation of the virtual camera), or by allowing the virtual camera to move backward. However, these solutions are not really intuitive for the user, especially in a context wherein the navigation of the 3D virtual environment navigation is mainly performed following the forward direction.

In order to better illustrate how the abovementioned drawback affects the navigation, reference is now made to the exemplary 3D menu illustrated in FIG. 1. Particularly, FIG. 1 is a top view of a 3D virtual environment wherein a menu formed by nine selectable items 1, 2, ..., 9 disposed according to a rhomboidal grid arrangement 100 is located on a plane defined by the orthogonal axis identified in figure with the references x and z (the third orthogonal axis y exiting from the sheet's plane). The menu is structured as a graph, whose nodes are the items 1, 2, ..., 9. Each item 1, 2, ..., 9 (node) of the graph is connected to adjacent items 1, 2, ..., 9 according to predetermined navigation directions; in the example considered, such predetermined navigation directions are six, and particularly:

AHEAD: having a direction forming an angle of 180 degrees with the axis z (e.g., the navigation from item 1 to item 4);

LEFT_AHEAD: having a direction forming an angle of 135 degrees with the axis z (e.g., the navigation from item 1 to item 2);

RIGHT_AHEAD: having a direction forming an angle of −135 degrees with the axis z (e.g., the navigation from item 1 to item 3);

BEHIND: having a direction parallel to the axis z (e.g., the navigation from item 4 to item 1);

LEFT_BEHIND: having a direction forming an angle of 45 degrees with the axis z (e.g., the navigation from item 4 to item 2), and RIGHT_BEHIND: having a direction forming an angle of −45 degrees with the axis z (e.g., the navigation from item 4 to item 3).

Two items 1, 2, ... of the menu are said to be in a relationship if it is possible to directly move from one to the other (and vice versa) in a single navigation step following a selected navigation direction without having to involve a third item. Said relationship are visually depicted in FIG. 1 with double ended arrows, referred to as "affordances"; from a topological point of view, two items 1, 2, ... of the menu are in a relationship if the corresponding nodes are adjacent in the graph.

If the virtual camera is positioned in the 3D virtual environment with the lens perpendicular to the axis z so as to have the item 1 in the close-up thereof—meaning that the item of the menu actually selected is the item 1—, a possible perspective view of the menu is illustrated in FIG. 2A. If the virtual camera is translated, without being rotated, along the direction LEFT_AHEAD so as to shot—and, thus, select—the item 2, the perspective view of the menu becomes the one illustrated in FIG. 2B. It has to be appreciated that compared to before, the items actually displayed are only six. For example, the item 1 from which the navigation is started is now no more visible, being now outside from the view of the virtual camera; however, it can be assumed that by translating back the virtual camera along the direction RIGHT_BEHIND, it is possible to view such item 1 again. After a navigation along the direction AHEAD to reach the item 8 (not illustrated), and the direction RIGHT_AHEAD to reach the item 9, the actual perspective view of the menu through the virtual camera is the one illustrated in FIG. 2C. In this situation, since the item 9 is located on the upper boundary of the items arrangement, the only item that is actually displayed is the item 9. All the other items 1, 2, ..., 8 are indeed "behind" the virtual camera, and thus are not displayed thereby. Now, if an user wanted to come back to the previously selected item 2, he/she would be disorientated, because without any displayed reference point it is not so obvious to remember which is the correct path to follow in order to come back to said specific item 2. It is clear that this drawback exacerbates as the number of items forming the menu increases.

In order to solve, or at least mitigate this drawback, known solutions provide for displaying again in the view of the virtual camera those items that have already been surpassed by the camera during the navigation, for example by relocating such items in still free positions of the 3D environment that are included in the actual view of the virtual camera. However, once the navigation has reached an item of the menu that was located on the upper boundary of the initial items arrangement, such relocation may have practically involved all the other items of the menu. In this case, the current items arrangement may result to be very different compared to the initial one, being formed after an arbitrary relocations of the items, that does not preserve the various connections among adjacent items specified by the initial arrangement. Thus, the user has the impression of being in a completely different contest compared to the one defined by the initial items arrangement.

According to further solutions known in the art, a very different arrangement of the items within the 3D virtual environment may be provided. For example, the items of the menu may be arranged on the surface of a sphere; however, for a perspective matter, with this arrangement the directions to be followed during the navigation of the menu are neither clear nor intuitive. According to a further solution, the items of the menu are arranged in a ring, with such ring that may be rotated during the navigation in two directions. In this case, the directions to be followed for the navigation of the items are surely both clear and intuitive; however, the space of the 3D virtual environment is exploited in a very inefficient way, especially when the number of items (and, thus, the radius of the corresponding ring) increases.

The PCT patent application WO 99/26160 discloses a hyperspace constructed of cells having paired connectors that define dimensions. Complex tissues of the cells in linear and cyclical ranks can be navigated and manipulated by use of a stepper and various view rasters. The types of cells may include text cells, audio cells, video cells, and executable cells. By the use of clone cells and a clone dimension, the cells may be duplicated or referenced by transclusion.

The PCT patent application WO 2008/115842 discloses an intuitive and natural menu selection pattern that allows a user to quickly and easily navigate though a hierarchical menu while mitigating errors associated with making a menu selection. The hierarchical menu can be presented as a flower-like design whereby a main menu item is a central item and lower level menu items are gathered around or near its corresponding upper level menu item. As a menu item is selected, its appearance can change indicating that such item has been selected.

3D user interfaces have been studied by Sun Microsystems, Inc. Specifically, a software built using the so-called Project Looking Glass (LG3D) has been proposed, which employs three basic menus: the ring menu, the arc menu and the cityscape menu. The ring menu has all of its items around an invisible ring. The arc menu has all of its items in an arc that trails off the borders of the screen at the top and bottom. The cityscape menu has a series of "buildings", each representing a file or directory. The directories contents are represented by little buildings on top of the directory building.

SUMMARY OF THE INVENTION

According to an aspect of the present invention, there is provided a method for navigating an interactive menu in a virtual environment. The interactive menu comprises a first number of selectable items. The method includes providing a grid on a delimited portion of a plane in the virtual environment. The grid includes a second number of locations equal to said first number. The method further includes providing a plurality of navigation directions within said grid and arranging each item of the menu on a respective location of the grid according to an item-grid arrangement. Adjacencies along said navigation directions among items located on the grid determine corresponding adjacency relationships; adjacency relationships are further determined along said navigation directions among items located on border locations of the grid which are situated on borders of said delimited portions. The method further includes shooting a first item in the close-up to enable selection of said item, receiving a navigation command identifying a navigation direction along which a second item to be selected is located, and altering the item-grid arrangement to relocate the items in different locations of the grid based on the received navigation command in such a way to shoot the second item in the close-up. Said altering the item-grid arrangement provides for preserving the adjacency relationships.

Advantageously, the grid is configured to have, along each navigation direction thereof, a respective fixed distance between each pair of adjacent locations along said navigation direction.

According to an embodiment of the present invention, the grid is such that, when replicated on the plane along the navigation directions so as to obtain a continuous development including a plurality of grid replicas, in which none of the locations of each grid replica overlaps with locations of another grid replica or of the grid, items located on border locations of each grid replica are in an adjacency relationship along corresponding navigation directions with corresponding items located on border locations of an adjacent grid replica or of the grid. Said items on border locations of each grid replica are located in said plane along the corresponding navigation direction at the respective fixed distance from said corresponding items located on border locations of an adjacent grid replica or of the grid.

According to an embodiment of the present invention, said delimited portion has a rhomboidal shape.

According to a further embodiment of the present invention, said delimited portion has a hexagonal shape.

According to a still further embodiment, said delimited portion has the shape of a "V".

Preferably, said navigation directions include a first navigation direction which is parallel to a reference axis contained in the plane, a second navigation direction forming an angle of 180 degrees with the reference axis, a third navigation direction forming an angle of 135 degrees with the reference axis, a fourth navigation direction forming an angle of −135 degrees with the reference axis, a fifth navigation direction forming an angle of 45 degrees with the reference axis, and a sixth navigation direction forming an angle of −45 degrees with the reference axis.

Advantageously, along the first or second navigation directions, said fixed distance is equal to a first distance, and, along the third, fourth, fifth or sixth navigation directions, said fixed distance is equal to a second distance lower than said first distance.

According to an embodiment of the present invention, the locations of the grid are arranged in a sequence of concentric circles starting from an innermost circle to an outermost circle; each circle includes a same number of locations.

According to a further embodiment of the present invention, the locations of the grid are arranged in a sequence of concentric semi-circles starting from an innermost semi-circle to an outermost semi-circle; each semi-circle includes a same number of locations.

According to an embodiment of the present invention, said altering the item-grid arrangement comprises relocating each item previously arranged in a location belonging to each circle or to each semi-circle into an adjacent location of the same circle or semi-circle, so as to rotate clockwise the item-grid arrangement if the received navigation direction is a first direction; relocating each item previously arranged in a location belonging to each circle or to each semi-circle into an adjacent location of the same circle or semi-circle, so as to rotate anticlockwise the item-grid arrangement if the received navigation direction is a second direction; relocating the items arranged in the locations of each circle or semi-circle into corresponding locations of the next outer circle or semi-circle in the sequence if the received navigation direction is a third direction, the items previously arranged in the outermost circle or semi-circle being instead relocated into corresponding locations of the innermost circle or semi-circle; relocating the items arranged in the locations of each circle or semi-circle into corresponding locations of the next inner circle or semi-circle in the sequence if the received navigation direction is a fourth direction. The items previously arranged in the innermost circle or semi-circle are instead relocated into corresponding locations of the outermost circle or semi-circle.

BRIEF DESCRIPTION OF THE DRAWINGS

These and other features and advantages of the present invention will be made evident by the following description of some exemplary and non-limitative embodiments thereof, to be read in conjunction with the attached drawings, wherein.

DETAILED DESCRIPTION OF EXEMPLARY EMBODIMENTS OF THE INVENTION

Figure 3:
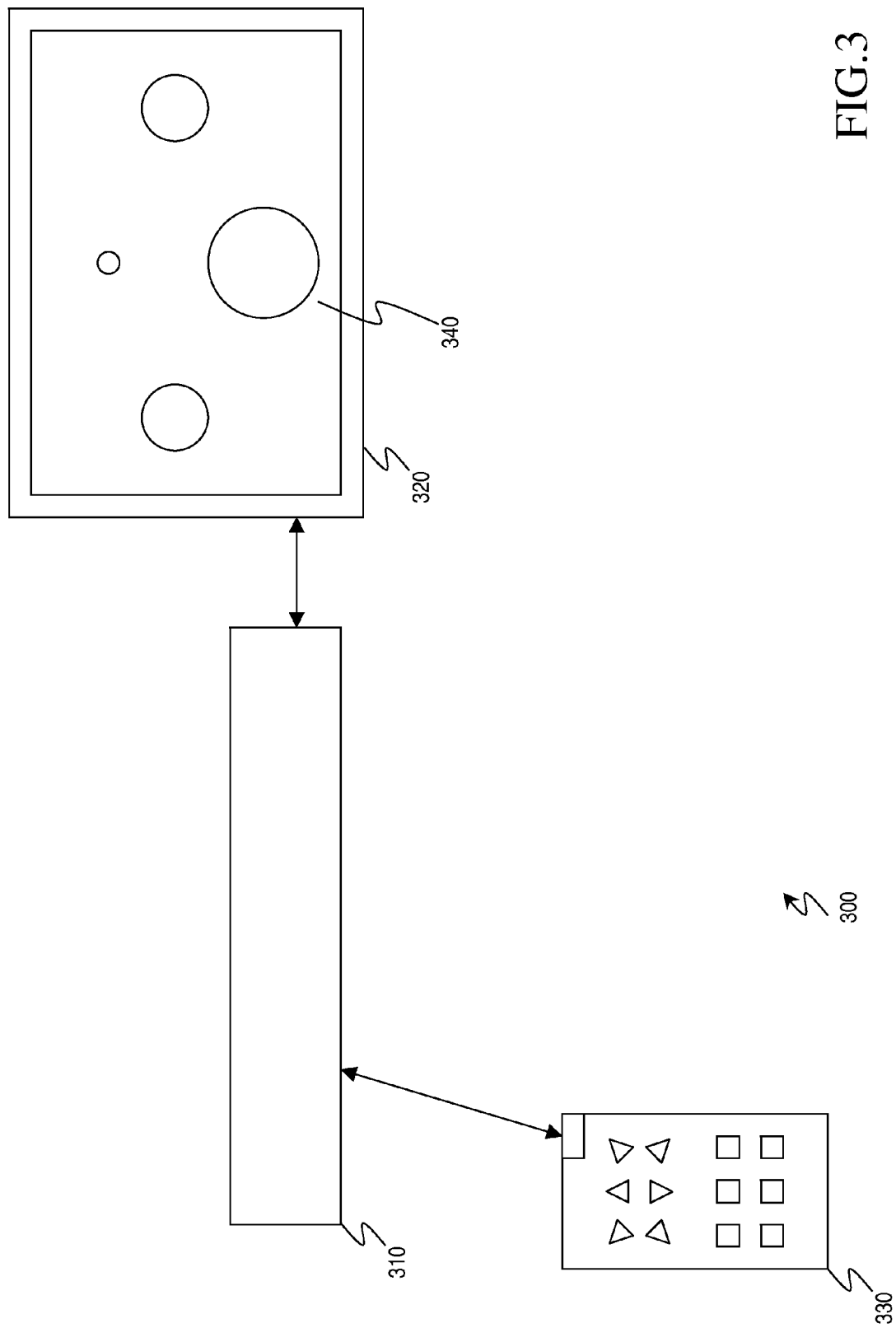
FIG. 3 is an exemplary scenario wherein solutions according to embodiments of the present invention can be applied.

With reference to the drawings, FIG. 3 illustrates an exemplary scenario 300 wherein the solution according to embodiments of the present invention can be applied. Particularly, with the reference 310 it is indicated a generic digital interactive device, such as a set-top box, a media center, a video game console and the like. The digital interactive device 310 is coupled to a display screen 320—such as a television panel—for the visualization of graphical images. An user may interact with the digital interactive device 310 by means of an input interface 330—e.g., a remote control—for submitting input commands thereto in order to adjust various settings such as the television channel, track number, volume, and the like. Alternatively, the digital interactive device 310, the display screen 320 and/or the input interface 330 may be embedded in a same device, such as in the case of a smartphone, an e-book reader, a portable video game console and the like. The interaction between user and digital interactive device 310 is carried out by means of a GUI that can be visualized on the display screen 320. Particularly, in the scenario illustrated in FIG. 3, such GUI is a 3D menu 340 formed by a plurality of selectable items arranged within a 3D environment; through the submission of navigation commands by means of the input interface 330, the user may navigate the 3D menu 340 visualized on the display screen for the selection of specific items.

In principle, according to an embodiment of the present invention, the items of the 3D menu 340 are arranged on locations of a grid located within a portion of the 3D virtual environment visualized on the display screen 320. Such grid includes a number of locations equal to the total number of items forming the 3D menu 340; moreover, the grid is arranged in such a way that the entirety of locations thereof—and, thus, the entirety of items forming the 3D menu 340—is always visualized on the display screen 320 through a first perspective view of a virtual camera. As will be appreciated in the following of the present description, according to an embodiment of the present invention each step of the 3D menu 340 navigation directed to the translation of the virtual camera according to a predetermined navigation direction implies a relocation of at least a portion of the items thereof onto new locations of the grid itself; this items relocation is carried out based on a cyclic navigation function that allows to preserve the relationships (affordances) between the items of the 3D menu 340 so as not to alter the structure of the 3D menu 340.

Now there will be illustrated and analyzed several types of items arrangement for 3D menus 340 wherein the solution according to embodiments of the invention can be applied.

Figure 1:
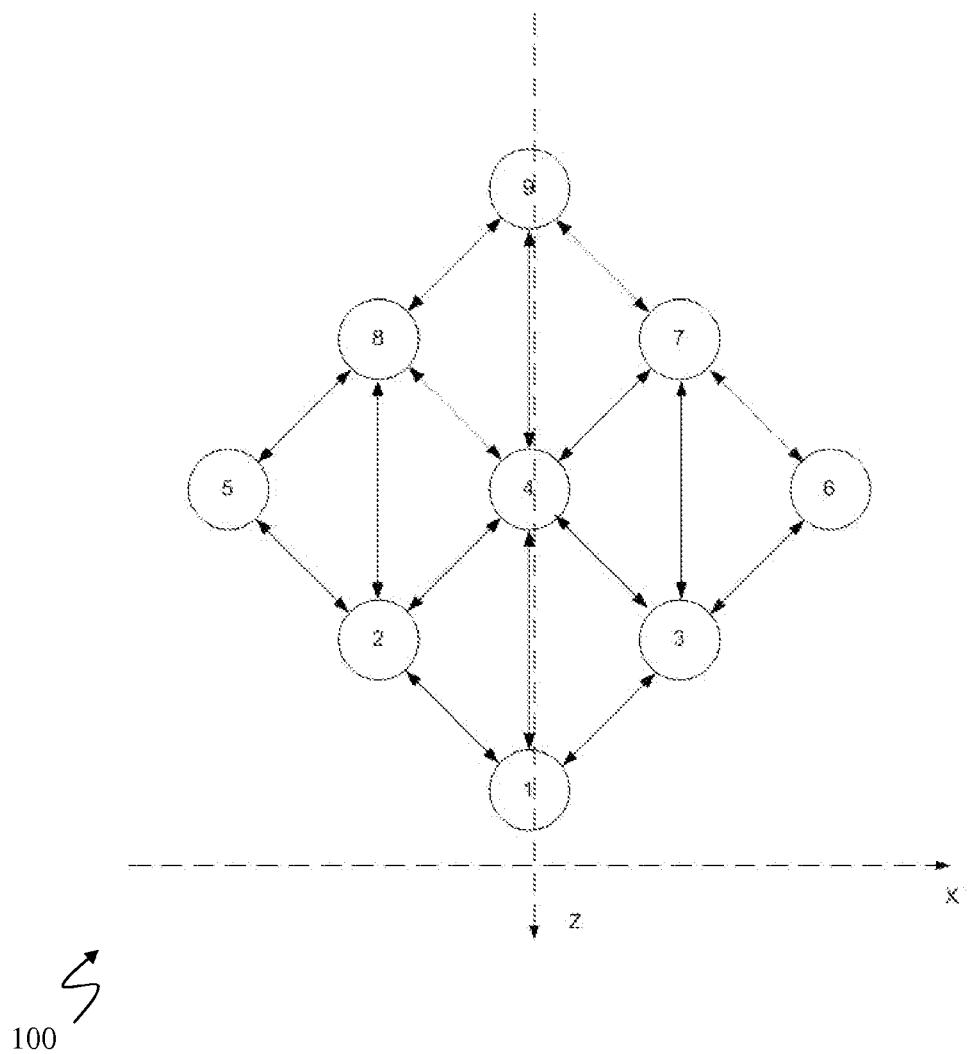
FIG. 1 is an exemplary 3D menu.
Figure 2A:
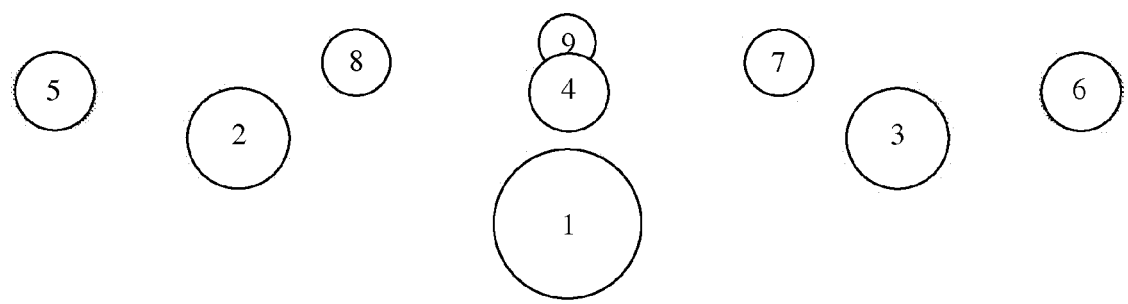
FIGS. 2A-2C are perspective views of the menu of FIG. 1 during respective steps of a navigation of the menu.
Figure 2B:
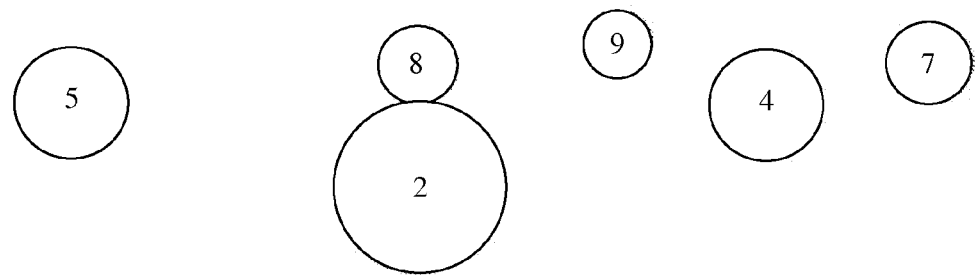
Figure 2C:
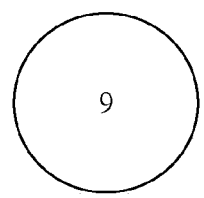

The first type of item arrangement that will be analyzed is based on a rhomboidal grid, such as the one illustrated in FIG. 1.

Figure 4:
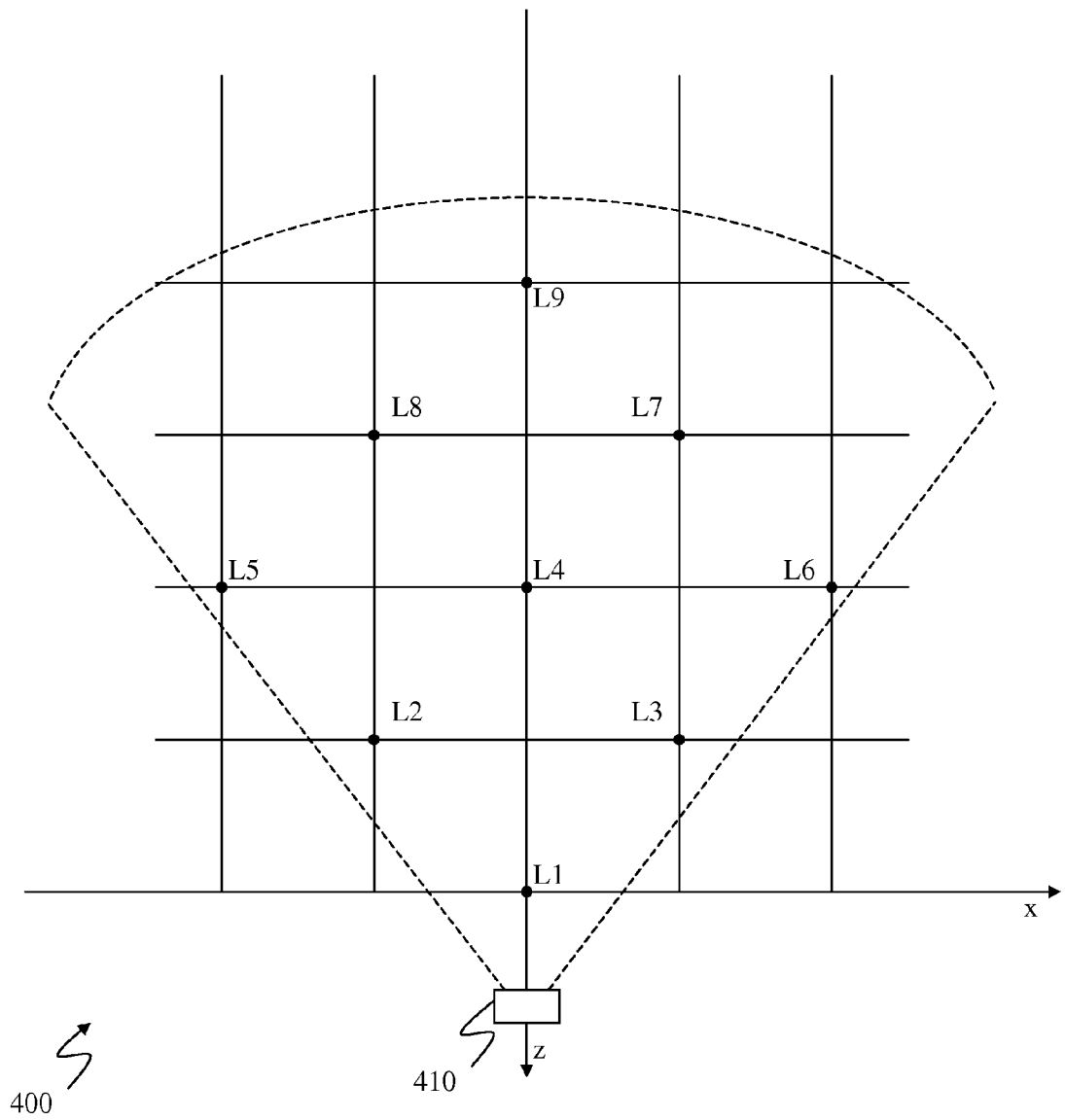
FIG. 4 is a top view of an exemplary rhomboidal grid wherein items of the 3D menu according to an embodiment of the present invention can be located.

FIG. 4 is a top view of an exemplary rhomboidal grid 400 wherein items of the 3D menu can be located. In the same way as for the rhomboidal grid arrangement 100 illustrated in FIG. 1, the 3D menu is formed by nine selectable items, and the rhomboidal grid 400 is located within the 3D virtual environment on a plane defined by the orthogonal axis identified in figure with the references x and z (the third orthogonal axis y exiting from the sheet's plane). The rhomboidal grid 400 includes a plurality of item locations Lk (k=1, 2, . . . ), whose number is equal to the number of items forming the 3D menu. According to the example at issue, the 3D menu is formed by nine selectable items 1, 2, . . . , 9, so that the items locations Lk are nine, too. Particularly, the rhomboidal grid 400 includes:

a first item location L1 that is located at coordinates (x=0, z=0);
a second item location L2 that is located at coordinates (x=−1, z=−1);
a third item location L3 that is located at coordinates (x=1, z=−1);
a fourth item location L4 that is located at coordinates (x=0, z=−2);
a fifth item location L5 that is located at coordinates (x=−2, z=−2);
a sixth item location L6 that is located at coordinates (x=2, z=−2);
a seventh item location L7 that is located at coordinates (x=1, z=−3);
an eighth item location L8 that is located at coordinates (x=−1, z=−3), and
a ninth item location L9 that is located at coordinates (x=0, z=−4).

By positioning the item 1 on the item location L1, the item 2 on the item location L2, the item 3 on the item location L3 and so on, the resulting item arrangement is equal to the rhomboidal grid arrangement 100 already illustrated in FIG. 1.

With the reference 410 it is depicted the virtual camera used to perform the first perspective view navigation of the 3D menu. Thanks to the peculiar shape of the rhomboidal grid 400, it is possible to position the virtual camera 410 within the 3D virtual environment so as to visualize all the item locations Lk—and, thus, all the items 1, 2, . . . —in a same shot.

Before describing how to perform the navigation of a 3D menu whose items are arranged on a rhomboidal grid (such as the grid 400) according to an embodiment of the present invention, a mathematical model of a generic rhomboidal grid items arrangement is now introduced.

According to an embodiment of the present invention, the rhomboidal grid and the way the items of the 3D menu are arranged on locations thereof are defined through two matrixes, namely a location matrix P and an identification matrix G. As will be appreciated in the following, the location matrix P provides an indication about the item locations Lk positions of the grid within the 3D virtual environment, while the identification matrix G provides an indication about where the items 1, 2, . . . of the menu are located within the grid.

The criteria used for the generation of such two matrixes are now described.

In order to construct a symmetric rhomboidal grid arrangement, the cardinality n of items 1, 2, . . . has to have the square root that is an integer, i.e., $$s=\sqrt{n},$$

wherein s∈Z.

Thus, n may be equal to 4, 9, 16 . . . . In the example depicted in FIGS. 1 and 4, n is equal to 9.

Both the location matrix P and the identification matrix G are s-by-s square matrixes. Each element P(i,j) (i=0 to s−1; j=0 to s−1) of the location matrix P corresponds to an item location Lk of the rhomboidal grid, while each element G(i,j) (i=0 to s−1; j=0 to s−1) of the identification matrix G corresponds to an item 1, 2, . . . of the 3D menu.

Given an item 1, 2, . . . of the 3D menu corresponding to a generic element G(i,j) of the identification matrix G, the items 1, 2, . . . that are adjacent thereto are the six ones identified by the elements G(i+1,j), G(i,j+1), G(i+1,j+1), G(i−1,j), G(i,j−1), G(i−1, j−1). These six items 1, 2, . . . are just the six items 1, 2, . . . that can be reached from the starting one through the navigation directions mentioned in the previous with reference to FIG. 1. Specifically, starting from the item 1, 2, . . . corresponding to the element G(i,j) of the identification matrix G:

a movement performed according to the navigation direction LEFT_AHEAD allows to reach the item 1, 2, . . . corresponding to the element G(i, j+1);
a movement performed according to the navigation direction RIGHT_AHEAD allows to reach the item 1, 2, . . . corresponding to the element G(i+/, j);
a movement performed according to the navigation direction AHEAD allows to reach the item 1, 2, . . . corresponding to the element G(i+1, j+1);
a movement performed according to the navigation direction LEFT_BEHIND allows to reach the item 1, 2, . . . corresponding to the element G(i, j−1)
a movement performed according to the navigation direction RIGHT_BEHIND allows to reach the item 1, 2, . . . corresponding to the element G(i−1, j), and
a movement performed according to the navigation direction BEHIND allows to reach the item 1, 2, . . . corresponding to the element G(i−1, j−1).

The item 1, 2, . . . actually selected among those forming the 3D menu, i.e., the one that is actually in the close-up of the virtual camera 410, is identified by the element G(0,0) of the identification matrix G.

The elements P(i,j) of the location matrix P provide instead the coordinates of the item locations Lk of the rhomboidal grid wherein the items 1, 2, . . . of the 3D menu are located, as arranged according to the identification matrix G.

Based on the abovementioned criteria, for the exemplary rhomboidal grid arrangement 100 illustrated in FIG. 1, the matrixes are the following ones:

$$G = \begin{bmatrix} 1 & 2 & 5 \\ 3 & 4 & 8 \\ 6 & 7 & 9 \end{bmatrix}$$

-continued $$P = \begin{bmatrix} (0,0,0) & (-1,0,-1) & (-2,0,-2) \\ (1,0,-1) & (0,0,-2) & (-1,0,-3) \\ (2,0,-2) & (1,0,-3) & (0,0,-4) \end{bmatrix}.$$

According to an embodiment of the present invention, each navigation step of the 3D menu is carried out through a relocation of the items 1, 2, . . . among the item locations Lk of the grid. Specifically, starting from a generic item arrangement identified by a corresponding identification matrix G, in order to perform a navigation step according to a selected navigation direction, the proposed solution provides for the generation of a new identification matrix G corresponding to a new item arrangement through the use of a specific function, referred to as cyclic navigation function NC.

In detail, assuming that the initial items arrangement is identified by a source identification matrix $G_{source}$ and that the items arrangement after the navigation step performed according to a selected navigation direction snd is identified by a target identification matrix $G_{target}$, according to an embodiment of the present invention the cyclic navigation function NC is defined in the following way:

$$NC: (i, j) \xrightarrow{snd} (p, q):$$

$i = 0, 1K \; s-1$ $j = 0, 1K \; s-1$ $G_{target}(i, j) = G_{source}(p, q)$ if $snd$ is LEFT_AHEAD: $\begin{cases} p = i \\ q = (j+1) = \text{mod} s \end{cases}$ if $snd$ is RIGHT_AHEAD: $\begin{cases} p = (i+1) \text{mod} s \\ q = j \end{cases}$ if $snd$ is AHEAD: $\begin{cases} p = (i+1) \text{mod} s \\ q = (j+1) \text{mod} s \end{cases}$ if $snd$ is LEFT_BEHIND: $\begin{cases} p = (i-1), p < 0 : p = s-1 \\ q = j \end{cases}$ if $snd$ is RIGHT_BEHIND: $\begin{cases} p = i \\ q = (j-i), q < 0 : q = s-1 \end{cases}$ if $snd$ is BEHIND: $\begin{cases} p = (i-1), p < 0 : p = s-1 \\ p = (j-i), q < 0 : q = s-1 \end{cases}$ wherein "mod" is the modulo operator, and "p=(i−1), p<0: p=s−1" should be interpreted as "p is set equal to (i−1), but if in this way p was lower than 0, else p is set equal to (s−1)".

In other words, the cyclic navigation function NC allows to obtain the target identification matrix $G_{target}$ through a shifting of the rows and/or columns of the source identification matrix $G_{source}$, wherein such shifting depends on the selected navigation direction snd. Particularly:

- if snd is LEFT_AHEAD, the target identification matrix $G_{target}$ is obtained by shifting the columns of the source identification matrix $G_{source}$ on the left;
- if snd is RIGHT_AHEAD, the target identification matrix $G_{target}$ is obtained by shifting upward the rows of the source identification matrix $G_{source}$;
- if snd is AHEAD, the target identification matrix $G_{target}$ is obtained by shifting upward the rows, and at the same time the columns on the left, of the source identification matrix $G_{source}$;
- if snd is LEFT_BEHIND, the target identification matrix $G_{target}$ is obtained by shifting the columns of the source identification matrix $G_{source}$ on the right;
- if snd is RIGHT_BEHIND, the target identification matrix $G_{target}$ is obtained by shifting downwards the rows of the source identification matrix $G_{source}$, and
- if snd is BEHIND, the target identification matrix $G_{target}$ is obtained by shifting downward the rows, and at the same time the columns on the right, of the source identification matrix $G_{source}$.

Figure 5A:
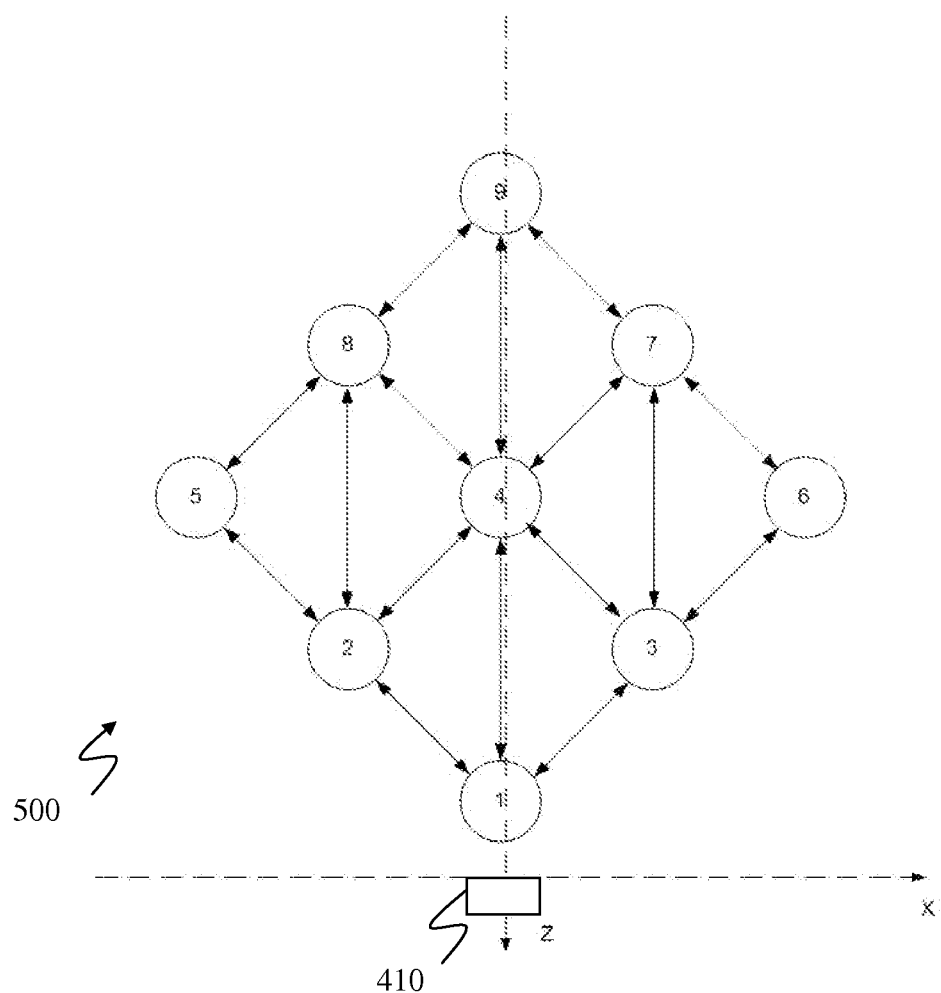
FIGS. 5A-5C are top views of an exemplary 3D menu formed by items arranged on the rhomboidal grid of FIG. 4 during some exemplary navigation steps performed according to an embodiment of the present invention.
Figure 5B:
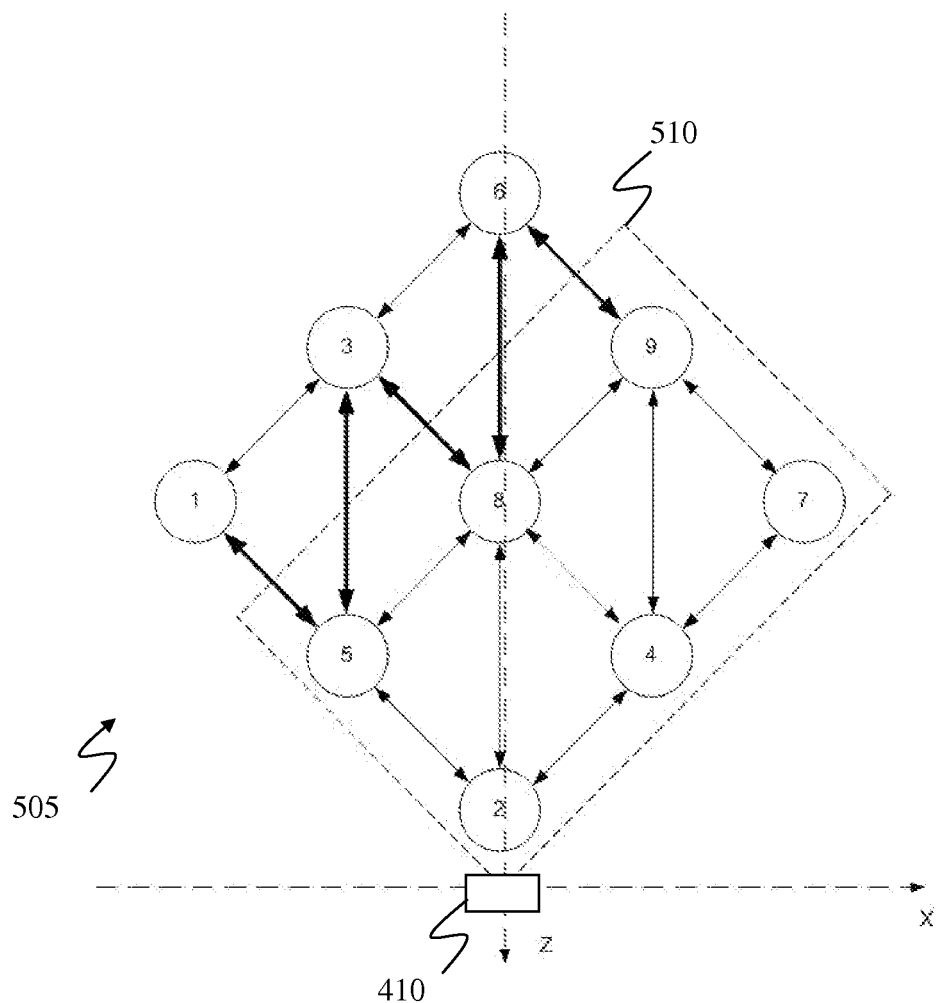
Figure 5C:
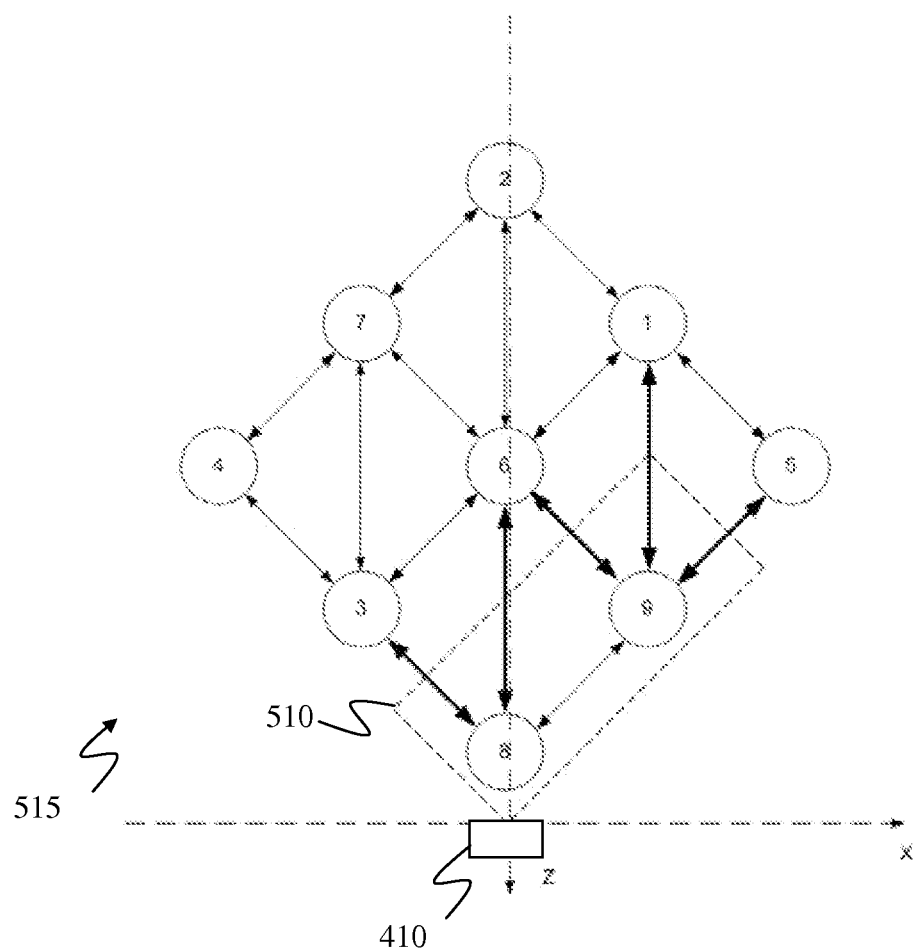

FIGS. 5A, 5B and 5C are top views of an exemplary 3D menu formed by nine items 1, 2, . . . arranged on the rhomboidal grid 400 already illustrated in FIG. 4 during some exemplary navigation steps performed according to an embodiment of the present invention.

In the beginning situation illustrated in FIG. 5A, the items 1, 2, . . . of the 3D menu are arranged on the item locations Lk of the rhomboidal grid 400 so as to form a rhomboidal grid arrangement 500 equal to the arrangement 100 illustrated in FIG. 1. In this situation, the source identification matrix $G_{source}$ is the following one:

$$G_{source} = \begin{bmatrix} 1 & 2 & 5 \\ 3 & 4 & 8 \\ 6 & 7 & 9 \end{bmatrix}$$

In this situation, the item of the menu that is actually selected is the item 1, being the one identified by the element $G_{source}(0,0)$. Indeed, by observing FIG. 5A, the item 1 is actually in the close-up of the virtual camera 410.

In order to select the item 2, the user has to submit the navigation direction LEFT_AHEAD. Thus, by applying the cyclic navigation function NC to the above source identification matrix $G_{source}$ with snd=LEFT_AHEAD, the resulting target identification matrix $G_{target}$ is:

$$G_{source} = \begin{bmatrix} 1 & 2 & 5 \\ 3 & 4 & 8 \\ 6 & 7 & 9 \end{bmatrix} \xrightarrow{NC(snd=LEFT\_AHEAD)} G_{target} = \begin{bmatrix} 2 & 5 & 1 \\ 4 & 8 & 3 \\ 7 & 9 & 6 \end{bmatrix}$$

The resulting items arrangement is depicted in FIG. 5B with the reference 505. As expected, the item identified by the element $G_{target}(0,0)$ is the item 2, which is now in the close-up of the virtual camera 410. Moreover, the first, second and third columns of the target identification matrix $G_{target}$ are equal to the second, third and first columns, respectively, of the source identification matrix $G_{source}$.

Observing FIG. 5B, the resulting item arrangement 505 can be subdivided into two different portions. A first portion—corresponding to the dashed area identified with the reference 510—comprises the items 2, 5, 4, 8, 9, 7, while a second portion—corresponding to the area outside the area 510—comprises the items 1, 3, 6. The first items arrangement portion corresponds to the only actual items arrangement that would be displayed if the virtual camera 410 was simply translated according to the navigation direction LEFT_AHEAD. Indeed, without the item relocation carried out through the cyclic navigation function NC, the items 1, 3, 6, would be located behind the virtual camera 410, or at least would be located in positions that are out of view therefrom. Conversely, thanks to the proposed solution, the items 1, 3, 6 are still in the view of the virtual camera 410, being relocated within corresponding item locations of the grid.

Moreover, said items 1, 3, 6 are now provided with new affordances (identified in the figure with the bolded arrows exiting from the area 510) toward the items 5, 8, 9. In the previous items arrangement 500, such items 5, 8, 9 were located at the borders thereof, i.e., they are items that were initially located in peripheral item locations Lk of the grid 400. Particularly, the item 1 has now a new affordance toward the item 5, the item 3 a first affordance toward the item 5 and a second affordance toward the item 8, and the item 6 has a first affordance toward the item 8 and a second affordance toward the item 9.

Assuming now that the user submits the navigation direction AHEAD for reaching the item 8, a new target identification matrix $G_{target}$ is generated (starting from a source identification matrix $G_{source}$ equal to the previously generated target identification matrix $G_{target}$):

$$G_{source} = \begin{bmatrix} 2 & 5 & 1 \\ 4 & 8 & 3 \\ 7 & 9 & 6 \end{bmatrix} \xrightarrow{NC(snd=AHEAD)} G_{target} = \begin{bmatrix} 8 & 3 & 4 \\ 9 & 6 & 7 \\ 5 & 1 & 2 \end{bmatrix}$$

The resulting items arrangement 515 is depicted in FIG. 5C. As expected, the item identified by the element $G_{target}(0,0)$ is the item 8, which is now in the close-up of the virtual camera 410. Moreover, the target identification matrix $G_{target}$ has been obtained by shifting upward the rows, and at the same time the columns on the left, of the source identification matrix $G_{source}$.

The number of items included in the area 510 is now considerably reduced, including only the items 8 and 9. Without the item relocation carried out through the cyclic navigation function NC, all the remaining items 1, 2, . . . would be located behind the virtual camera 410.

Moreover, a first new affordance is introduced between the item 1 and the item 9, and a second new affordance is introduced between the item 5 and the item 9.

It has to be appreciated that during all the three above-mentioned navigation steps, the location matrix P is always:

$$P = \begin{bmatrix} (0,0,0) & (-1,0,-1) & (-2,0,-2) \\ (1,0,-1) & (0,0,-2) & (-1,0,-3) \\ (2,0,-2) & (1,0,-3) & (0,0,-4) \end{bmatrix}$$

Indeed, according to an embodiment of the present invention, the navigation of the 3D menu is performed on the same grid wherein the items are located at the beginning; each navigation step is nothing but a relocation of the items within the item locations of the same grid (in the example at issue, the rhomboidal grid 400).

Generalizing, thanks to the cyclicity of the navigation offered by the cyclic navigation function NC, the predetermined affordances of the initial items arrangement are preserved, as well as new affordances—from now on, "border affordances"—are introduced from the items of the arrangement—from now on, "border items"—that were positioned on item locations on the borders of the grid.

Specifically, given an item arrangement corresponding to an s-by-s identification matrix G, whose items are arranged on a plurality of item locations of a rhomboidal grid, the border items are the items corresponding to elements G(i,j) that belong to the first or last row and/or to the first or last column of the identification matrix G. It can be easily shown that eight different types of border items exists, and particularly the items identified by the following elements G(i,j) of the identification matrix G:

G(0,0);

G(i,0), i=1, 2, . . . , s−2;

G(s−1, 0);

G(s−1,j), j=1, 2, . . . , s−2;

G(s−1, s−1);

G(i, s−1), i=1, 2, . . . , s−2;

G(0, s−1);

G(0,j), j=1, 2, . . . , s−2.

According to an embodiment of the present invention, each border item is associated with a corresponding set of border affordances; specifically:

$$G(0,0): \begin{cases} G(0,0) \to G(s-1, s-1), \text{BEHIND} \\ G(0,0) \to G(0, s-1), \text{RIGHT\_BEHIND} \\ G(0,0) \to G(s-1, 0), \text{LEFT\_BEHIND} \end{cases}$$

$$G(i,0)(i=1,2,\ldots,s-2): \begin{cases} G(i,0) \to G(i, s-1), \\ \text{BEHIND} \\ G(i,0) \to G(i-1, s-1), \\ \text{RIGHT\_BEHIND} \end{cases}$$

$$G(s-1, 0): \begin{cases} G(s-1,0) \to G(s-1, s-1), \text{RIGHT\_BEHIND} \\ G(s-1,0) \to G(0,0), \text{LEFT\_AHEAD} \\ G(s-1,0) \to G(0,1), \text{AHEAD} \\ G(s-1,0) \to G(s-2, s-1), \text{BEHIND} \end{cases}$$

$$G(s-1, j)(j=1,2,\ldots,s-2): \begin{cases} G(s-1, j) \to G(0, j), \\ \text{RIGHT\_AHEAD} \\ G(s-1, j) \to G(0, j+1), \\ \text{AHEAD} \end{cases}$$

$$G(s-1, s-1): \begin{cases} G(s-1, s-1) \to G(0, s-1), \text{RIGHT\_AHEAD} \\ G(s-1, s-1) \to G(0, 0), \text{AHEAD} \\ G(s-1, s-1) \to G(s-1, 0), \text{LEFT\_AHEAD} \end{cases}$$

$$G(i, s-1)(i=1,2,\ldots,s-2): \begin{cases} G(i, s-1) \to G(i, 0), \text{LEFT\_AHEAD} \\ G(i, s-1) \to G(i+1, 0), \text{AHEAD} \end{cases}$$

$$G(0, s-1): \begin{cases} G(0, s-1) \to G(s-1, s-1), \text{LEFT\_BEHIND} \\ G(0, s-1) \to G(s-1, s-2), \text{BEHIND} \\ G(0, s-1) \to G(0,0), \text{LEFT\_AHEAD} \\ G(0, s-1) \to G(1, 0), \text{AHEAD} \end{cases}$$

$$G(0, j)(j=1,2,\ldots,s-2): \begin{cases} G(0, j) \to G(s-1, j), \text{RIGHT\_BEHIND} \\ G(0, j) \to G(s-1, j-1), \text{BEHIND} \end{cases}$$

wherein "G(0,0) G(s−1, s−1), BEHIND" is the border affordance between the item identified by the element G(0,0) and the item identified by the element G(s−1, s−1) that extends along the navigation direction BEHIND, "G(0,0)→G(0, s−1), RIGHT_BEHIND" is the border affordance between the item identified by the element G(0,0) and the item identified by the element G(0, s−1) that extends along the navigation direction RIGHT_BEHIND, and so on.

The number abn of border affordances that can be introduced during the navigation of a 3D menu exploiting the proposed cyclic navigation function NC is equal to:

$$abn = 14 + 4 \cdot \Sigma_{k=1}^{s-2} 2.$$

In the example at issue, wherein s is equal to 3, abn is equal to 22.

The proposed solution is based on the assumption that the items forming the 3D menu are arranged on a symmetric rhomboidal grid; thanks to the peculiar shape of the grid, each navigation step within the 3D menu provides for a relocation of the items within the item location of the grid which preserves both the rhomboidal shape of the arrangement and the affordances between the items. In order to better illustrate why an item arrangement having a rhomboidal shape provides the abovementioned advantages, reference is now made to FIG. 6A.

Figure 6A:
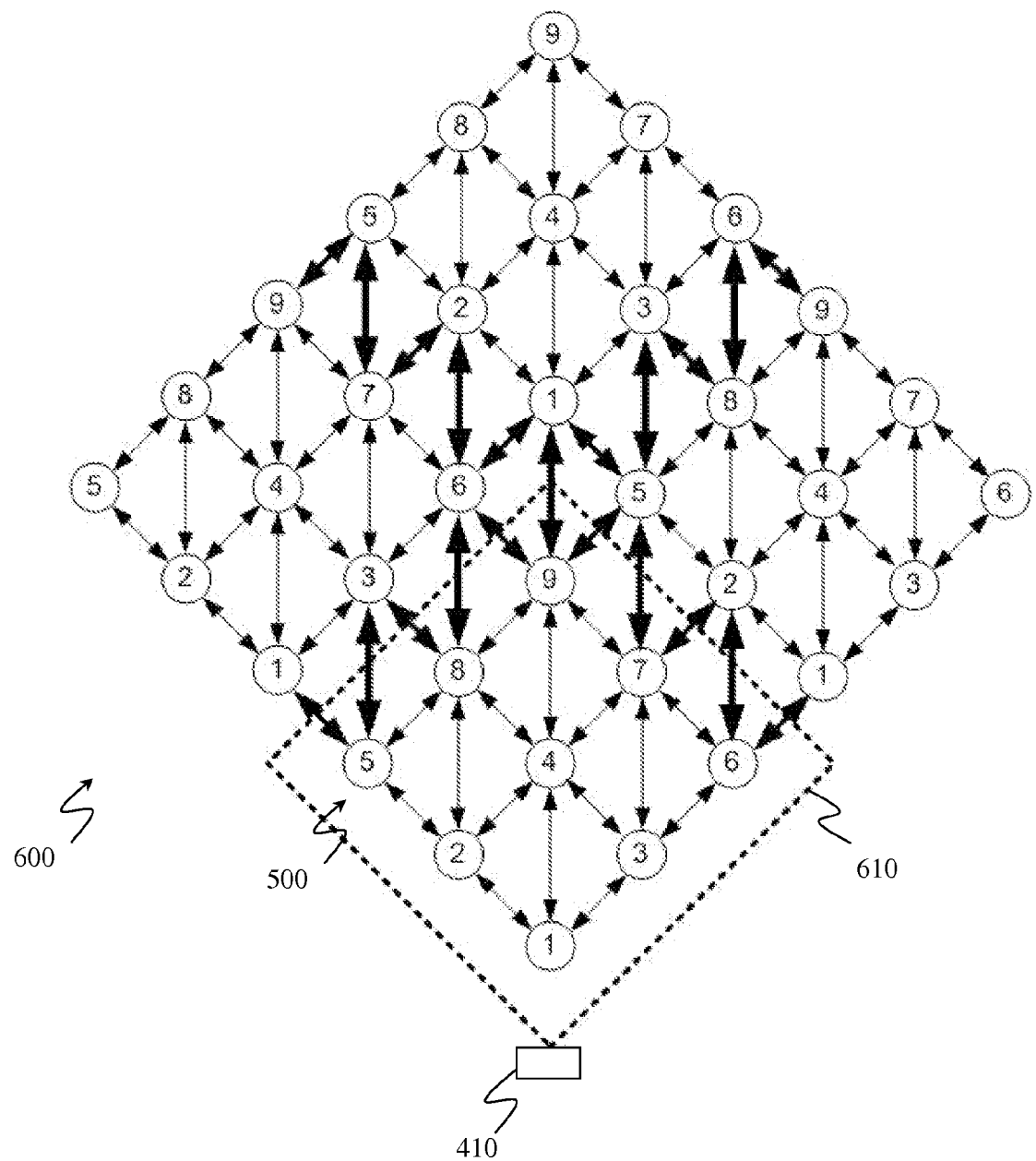
FIG. 6A depicts a development of the item arrangement illustrated in FIG. 5A obtained by replicating the item arrangement along the predetermined navigation directions.

Specifically, FIG. 6A depicts a development 600 (on the plane defined by the orthogonal axis x and z) of the item arrangement 500 illustrated in FIG. 5A, obtained by replicating such item arrangement 500 along the predetermined navigation directions. The resulting development is like a tiled floor, wherein each tile is a respective replica of the item arrangement 500. The border items of each tile are connected with respective border items of the adjacent tiles through respective border affordances (represented in figure by means of bolded arrows).

The development 600 may be exploited for illustrating—in a further, different, way with respect to the above—how the previously described cyclic navigation function NC operates during the navigation of the menu.

Specifically, at the beginning of the navigation, the virtual camera 410 is located so as to have the item 1 of a generic item arrangement 500 replica (e.g., the one located in the lowest portion of the development 600) in the close-up. The view of the virtual camera 410—delimited by the dashed frame identified with the reference 610—is such to include only the items 1, 2, . . . of said specific item arrangement 500 replica, excluding any other items which belong to other item arrangement replicas. This situation is the one already illustrated in FIG. 5A, wherein the corresponding identification matrix is:

$$G = \begin{bmatrix} 1 & 2 & 5 \\ 3 & 4 & 8 \\ 6 & 7 & 9 \end{bmatrix},$$

which implies that the item actually selected is the item 1.

Figure 6B:
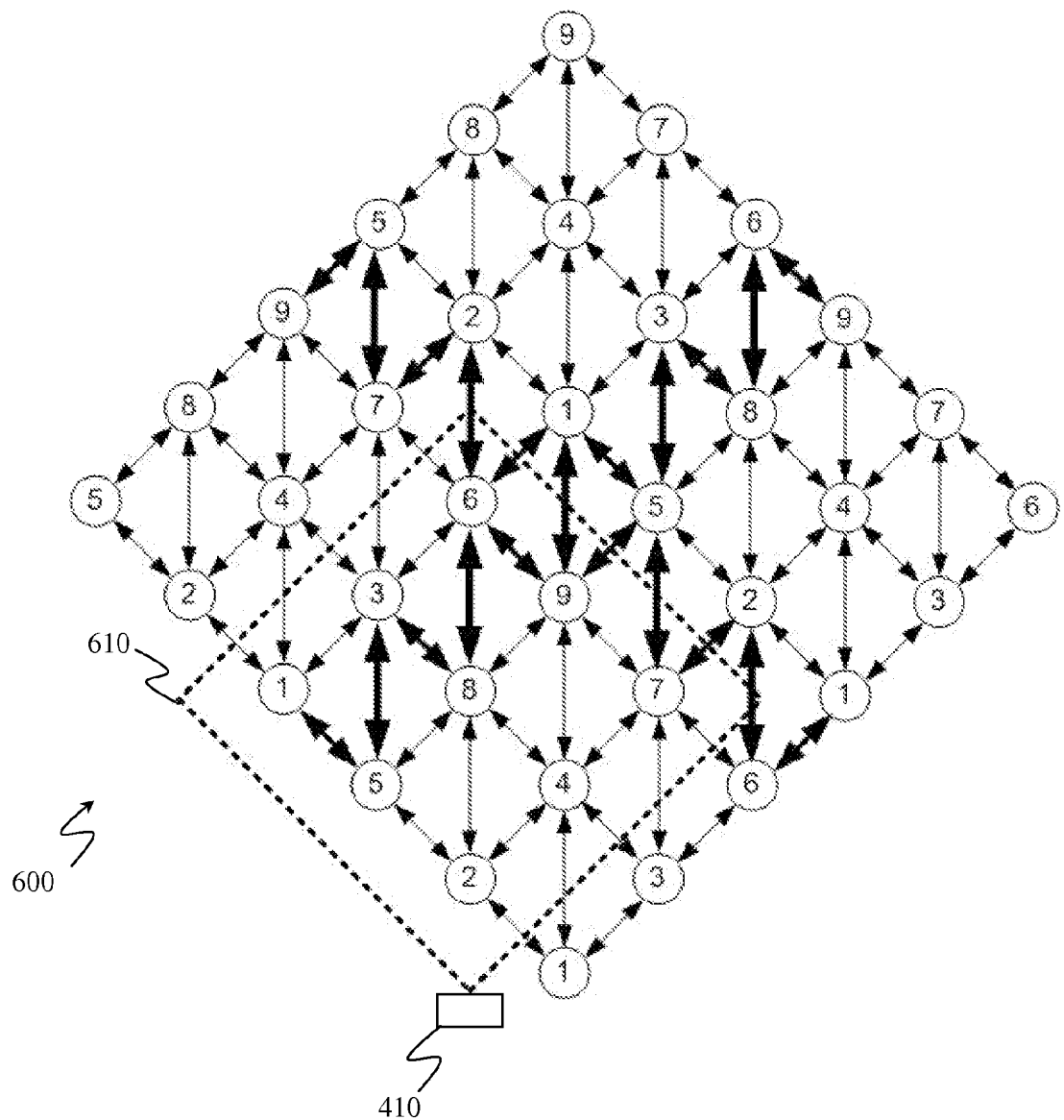
FIG. 6B depicts the development of FIG. 6A after a virtual camera movement performed according to a navigation direction.

Assuming now to carry out a virtual camera 410 movement according to the navigation direction LEFT_AHEAD for selecting the item 2, the frame 610 is accordingly shifted as illustrated in FIG. 6B. As expected, the items 1, 2, . . . encircled by the frame 610 correspond to the item arrangement 505 already illustrated in FIG. 5B. Indeed, the corresponding identification matrix is:

$$G = \begin{bmatrix} 2 & 5 & 1 \\ 4 & 8 & 3 \\ 7 & 9 & 6 \end{bmatrix}.$$

Thus, according to an embodiment of the present invention the initial items arrangement is replicated along the navigation direction so as to obtain a corresponding development; then, adjacent item arrangement replicas within the development are put in relationship to each other through the addition of border affordances. The items arrangement currently shot by the virtual camera is selected from the entirety of items forming the development through a frame having a shape such to encircle the exact number of items of the initial items arrangement. The navigation is performed by shifting such frame (according to the navigation directions) within the development, so as to select time by time a respective collection of items. In this way, during each step of the navigation the frame always circles a set of items that corresponds to all the items included in the initial arrangement. Specifically, if the initial items arrangement includes nine items, and specifically the items 1, 2, 3, 4, 5, 6, 7, 8, 9, the collection of items selected through the frame during each step always include said nine items 1, 2, 3, 4, 5, 6, 7, 8, 9 (plausibly, taken from items arrangement replicas), no more, no less.

In order to keep unchanged the structure of the arrangement actually displayed by the virtual camera and the affordances between the items during each step of the navigation, the development obtained through the replication of the initial item arrangement has to be "continuous", in the sense that the items forming the whole development have to fill the plane of the virtual environment wherein it is situated (in the example considered, the plane defined by the orthogonal axis x and z) with no overlaps and no gaps. As a consequence, in order to obtain a development having the abovementioned features, the items arrangement to be replicated must have a suitable shape, such as the rhomboidal one described above.

Figure 7:
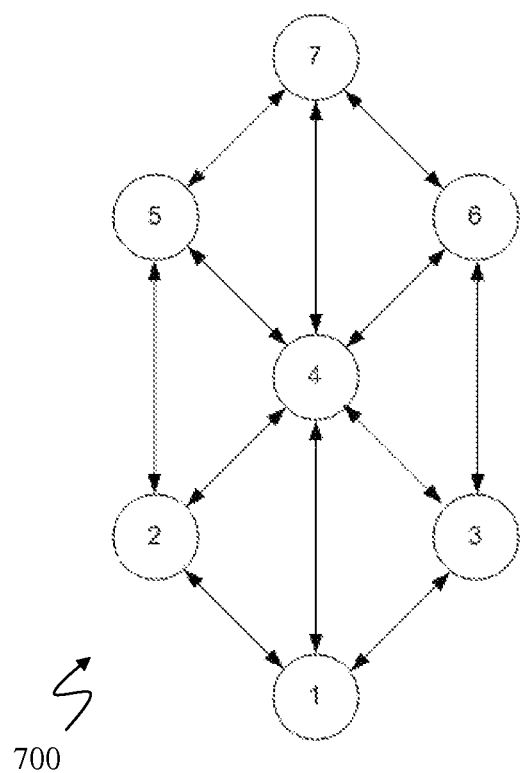
FIG. 7 is a top view of an exemplary hexagonal grid arrangement having a rhomboidal pattern wherein items of the 3D menu according to a further embodiment of the present invention can be located.

An alternative items arrangement that can be replicated so as to obtain a continuous development according to an embodiment of the present invention is shown in FIG. 7. Specifically, in the embodiment illustrated in FIG. 7, seven items 1, 2, . . . of a 3D menu are arranged within the 3D virtual environment according to a hexagonal grid arrangement 700 having a rhomboidal pattern. The hexagonal grid arrangement 700 illustrated in FIG. 7 is substantially equal to the rhomboidal grid arrangement already illustrated in FIGS. 1 and 5A, with the difference that the hexagonal grid arrangement 700 lacks the two items located at the lateral edges (specifically, making reference to the grid 400 illustrated in the FIG. 4, the ones corresponding to the fifth and sixth item locations L5, L6).

Figure 8A:
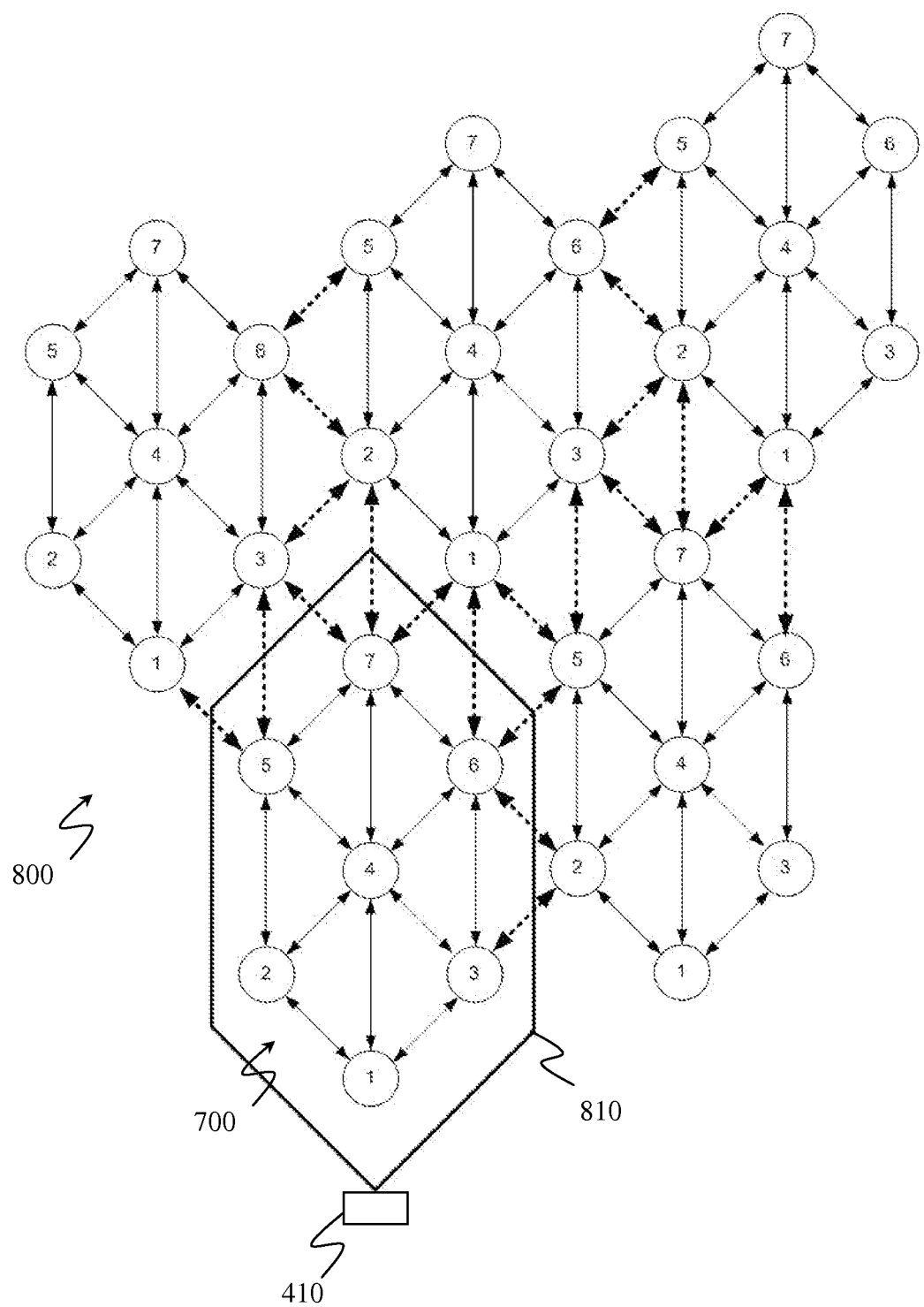
FIG. 8A depicts a development of the item arrangement of FIG. 7.

The hexagonal grid arrangement 700 illustrated in FIG. 7 is provided with a certain symmetry along the navigation directions, which allows to obtain a continuous development when replicated therealong; specifically, said development is illustrated in FIG. 8A with the reference 800. In the same way as the development 600 illustrated in FIG. 6A, the border items of each arrangement 700 replica (tile) are connected with respective border items of the adjacent replicas through respective border affordances (represented in figure by means of dashed arrows).

At the beginning of the navigation, the virtual camera 410 is located so as to have the item 1 of a generic item arrangement 700 replica (e.g., the one located in the lowest portion of the development 800) in the close-up. The view of the virtual camera 410—delimited by the frame identified with the reference 810—is such to include only the items 1, 2, . . . of said specific item arrangement 700 replica, excluding any other item which belongs to other item arrangement replicas.

Figure 8B:
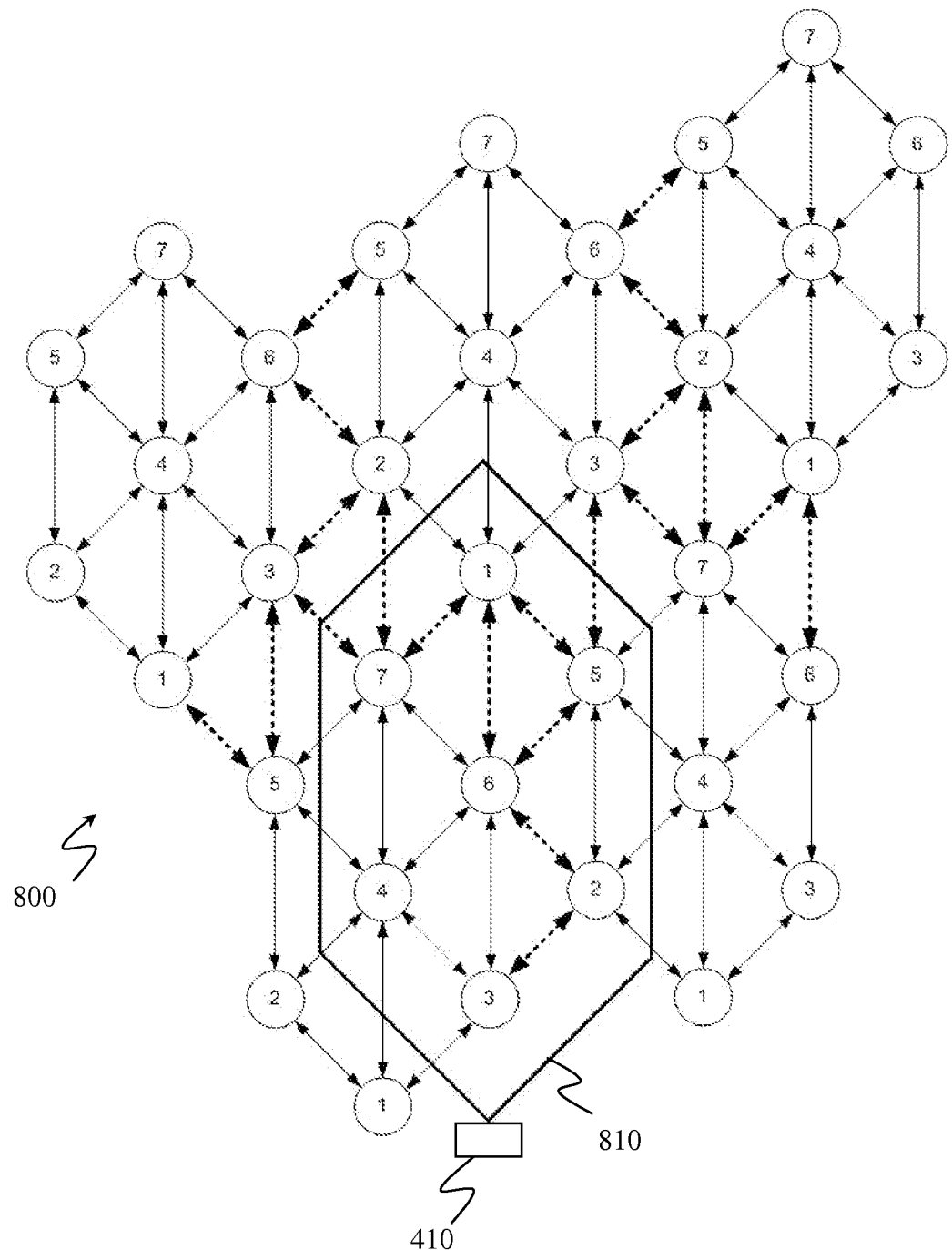
FIG. 8B depicts the development of FIG. 8A after a virtual camera movement performed according to a navigation direction.

Assuming now to carry out a virtual camera 410 movement according to the navigation direction RIGHT_AHEAD for selecting the item 3, the frame 810 is accordingly shifted as illustrated in FIG. 8B. Making reference to the example at issue, it can be observed that the items 1, 5, and 2 that were shot by the virtual camera 410 during the previous navigation step, have now been advantageously relocated to reappear within the frame 810.

Figure 9:
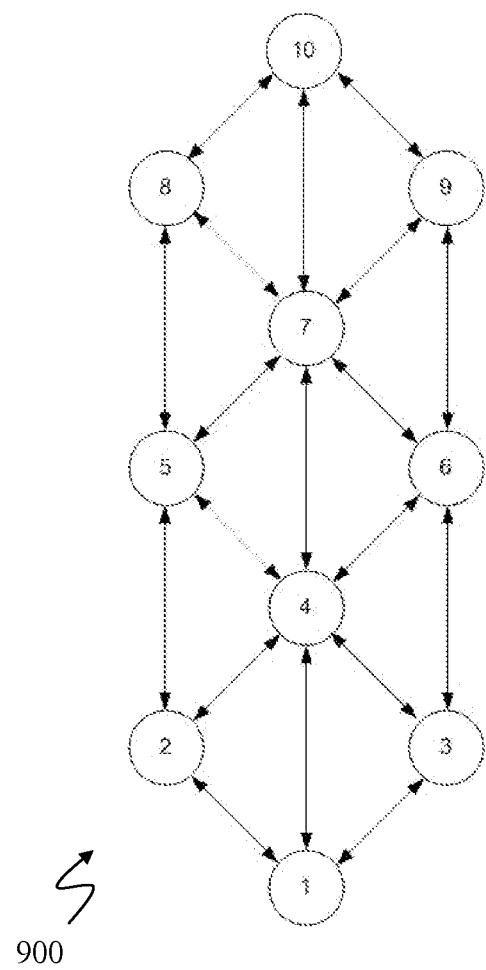
FIG. 9 is a top view of another exemplificative hexagonal grid arrangement having a rhomboidal pattern according to an embodiment of the present invention.

Another exemplificative hexagonal grid arrangement having a rhomboidal pattern is illustrated in FIG. 9 with the reference 900. In this case, the arrangement is formed by ten items 1, 2, . . . .

In the same way as for the rhomboidal grid arrangement previously described, the items of the hexagonal grid arrangement having a rhomboidal pattern are located in corresponding item locations of a corresponding grid (not illustrated) within the 3D virtual environment. According to an embodiment of the present invention, such grid and the way the items of the 3D menu are arranged on locations thereof are defined through the location matrix P and the identification matrix G.

Specifically, in order to generate a hexagonal grid arrangement having a rhomboidal pattern, the cardinality n of items 1, 2, . . . has to be equal to:

$$n = s^2 - 2 \cdot \Sigma_{i=1}^{k} i,$$

wherein s=3, 4, . . . and k=1, 2, . . . , $\lfloor s/2 \rfloor$.

For example:
s=3, k=1→n=7
s=4, k=1→n=14
s=4, k=2→n=10

The cases wherein n is equal to 7 and 10 have been already illustrated in the FIGS. 7 and 9, respectively.

The matrixes G and P of the exemplary hexagonal grid arrangement 700 illustrated in FIG. 7 are the following ones:

$$G = \begin{bmatrix} 1 & 2 & 0 \\ 3 & 4 & 5 \\ 0 & 6 & 7 \end{bmatrix}$$

$$P = \begin{bmatrix} (0,0,0) & (-1,0,-1) & (-2,0,-2) \\ (1,0,-1) & (0,0,-2) & (-1,0,-3) \\ (2,0,-2) & (1,0,-3) & (0,0,-4) \end{bmatrix}.$$

It can be appreciated that this location matrix P coincides to the one corresponding to the rhomboidal grid arrangement, and that the elements G(0,2) and G(2,0) of the identification matrix G are equal to zero. This means that the seven items 1, 2, . . . of the hexagonal grid arrangement 700 are located on seven selected item locations of a nine item locations grid equal to the one that has been previously described for the rhomboidal grid arrangement. This implies that two item locations of the grid are left empty. The item locations left empty are those identified by elements of the location matrix P that correspond to elements of the identification matrix G equal to zero (in the example at issue, the item locations corresponding to the coordinates (1, 0, -2) and (-2, 0, -2)).

It will be now described how the navigation of a 3D menu whose items are arranged according to an hexagonal grid arrangement having a rhomboidal pattern is performed according to an embodiment of the present invention. For this purpose, reference is made to the exemplary hexagonal grid arrangement 700 illustrated in FIG. 7.

Instead of explicitly calculating a specific cyclic navigation function NC for the generation of a target identification matrix $G_{target}$ from a source identification matrix $G_{source}$ (as has been previously done for the rhomboidal arrangement), the way the navigation is performed will be now described making reference to the development 800 of the exemplary hexagonal grid arrangement 700.

Specifically, the beginning situation is the one illustrated in FIG. 8A, wherein the item 1 is in the close-up of the virtual camera 410; the corresponding source identification matrix $G_{source}$ is then equal to:

$$G_{source} = \begin{bmatrix} 1 & 2 & 0 \\ 3 & 4 & 5 \\ 0 & 6 & 7 \end{bmatrix}$$

According to an embodiment of the present invention, a corresponding source development identification matrix $G'_{source}$ is then generated taking into account how the hexagonal grid arrangement 700 is replicated so as to generate the development 800 illustrated in FIG. 8A. Particularly, the source development identification matrix $G'_{source}$ is an n-by-n matrix—wherein n is the cardinality of the items 1, 2, . . . forming the hexagonal grid arrangement (n equal to seven, in the example at issue)—obtained by replicating several times the source identification matrix $G_{source}$, taking care of suitably displacing the source identification matrix $G_{source}$ replicas so as to "cover" the elements equal to zero of each replica with elements different than zero of other replicas. In detail, a first source identification matrix $G_{source}$ replica is firstly located within the source development identification matrix $G'_{source}$ in such a way the element $G'_{source}(0,0)$ is equal to the element $G_{source}(0,0)$; then, a subsequent source identification matrix $G_{source}$ replica is subsequently added, in such a way to cover an element equal to zero of the previously added replica with an element (different than zero) thereof. The process is reiterated until the source development identification matrix $G'_{source}$ is completely filled.

Making reference to the example at issue, the source development identification matrix $G'_{source}$ corresponding to the development 800 illustrated in FIG. 8A is:

$$G'_{source} = \begin{bmatrix} 1 & 2 & 6 & 7 & 3 & 4 & 5 \\ 3 & 4 & 5 & 1 & 2 & 6 & 7 \\ 2 & 6 & 7 & 3 & 4 & 5 & 1 \\ 4 & 5 & 1 & 2 & 6 & 7 & 3 \\ 6 & 7 & 3 & 4 & 5 & 1 & 2 \\ 5 & 1 & 2 & 6 & 7 & 3 & 4 \\ 7 & 3 & 4 & 5 & 1 & 2 & 6 \end{bmatrix}$$

It can be observed that the elements of the source development identification matrix $G'_{source}$ are arranged in the same way as the items 1, 2, . . . are arranged within the development 800 illustrated in FIG. 8A. Specifically, starting from the element $G'_{source}(0,0)$, corresponding to the item 1—which is in the one in the close-up of the virtual camera 410—, scrolling down through the elements $G'_{source}(i,0)$ (i=0 to n-1) of the first column corresponds to navigate the development 800 along the navigation direction RIGHT_AHEAD passing through the items 3, 2, 4, 6, 5, 7, respectively.

According to an embodiment of the present invention, in order to navigate within items that are arranged according to a hexagonal grid arrangement having a rhomboidal pattern, the cyclic navigation function NC previously described for the navigation of the rhomboidal grid arrangement is applied to the source development identification matrix $G'_{source}$.

For example, making reference to the example at issue (situation depicted in FIG. 8A), and assuming now to carry out a virtual camera 410 movement according to the navigation direction RIGHT_AHEAD for selecting the item 3 (situation depicted in FIG. 8B), the cyclic navigation function NC is applied to the previously generated source development identification matrix $G'_{source}$ with snd=RIGHT_AHEAD. The resulting target development identification matrix $G'_{target}$ is:

$$G'_{source} = \begin{bmatrix} 1 & 2 & 6 & 7 & 3 & 4 & 5 \\ 3 & 4 & 5 & 1 & 2 & 6 & 7 \\ 2 & 6 & 7 & 3 & 4 & 5 & 1 \\ 4 & 5 & 1 & 2 & 6 & 7 & 3 \\ 6 & 7 & 3 & 4 & 5 & 1 & 2 \\ 5 & 1 & 2 & 6 & 7 & 3 & 4 \\ 7 & 3 & 4 & 5 & 1 & 2 & 6 \end{bmatrix} \xrightarrow{(snd=RIGHT\_AHEAD)} G'_{target} =$$

$$\begin{bmatrix} 3 & 4 & 5 & 1 & 2 & 6 & 7 \\ 2 & 6 & 7 & 3 & 4 & 5 & 1 \\ 4 & 5 & 1 & 2 & 6 & 7 & 3 \\ 6 & 7 & 3 & 4 & 5 & 1 & 2 \\ 5 & 1 & 2 & 6 & 7 & 3 & 4 \\ 7 & 3 & 4 & 5 & 1 & 2 & 6 \\ 1 & 2 & 6 & 7 & 3 & 4 & 5 \end{bmatrix}$$

The target identification matrix $G_{target}$ corresponding to the situation depicted in FIG. 8B, wherein the virtual camera 410 has the element 3 in the close-up thereof, is obtained by extracting the s-by-s sub-matrix corresponding to the first s rows and first s columns of the target development identification matrix $G'_{target}$ and setting the elements $G_{target}(0, s-1)$ and $G_{target}(s-1, 0)$ of such extracted sub-matrix to zero; particularly, the resulting target identification matrix $G_{target}$ is equal to:

$$G_{target} = \begin{bmatrix} 3 & 4 & 0 \\ 2 & 6 & 7 \\ 0 & 5 & 1 \end{bmatrix}$$

The elements of the target identification matrix $G_{target}$ correspond to the specific items arrangement selected by the frame 810 of the FIG. 8B, wherein the items 1, 5 and 2 have been relocated not to be excluded from the virtual camera 410 shot.

The previously described procedure can be applied in an analogous way for obtaining the target identification matrixes $G_{target}$ corresponding to movements performed along the six navigation directions; specifically:

$$G_{source} = \begin{bmatrix} 1 & 2 & 0 \\ 3 & 4 & 5 \\ 0 & 6 & 7 \end{bmatrix} \xrightarrow{snd=LEFT\_AHEAD} G_{target} = \begin{bmatrix} 2 & 6 & 0 \\ 4 & 5 & 1 \\ 0 & 7 & 3 \end{bmatrix}$$

$$G_{source} = \begin{bmatrix} 1 & 2 & 0 \\ 3 & 4 & 5 \\ 0 & 6 & 7 \end{bmatrix} \xrightarrow{snd=RIGHT\_AHEAD} G_{target} = \begin{bmatrix} 3 & 4 & 0 \\ 2 & 6 & 7 \\ 0 & 5 & 1 \end{bmatrix}$$

$$G_{source} = \begin{bmatrix} 1 & 2 & 0 \\ 3 & 4 & 5 \\ 0 & 6 & 7 \end{bmatrix} \xrightarrow{snd=AHEAD} G_{target} = \begin{bmatrix} 4 & 5 & 0 \\ 6 & 7 & 3 \\ 0 & 1 & 2 \end{bmatrix}$$

$$G_{source} = \begin{bmatrix} 1 & 2 & 0 \\ 3 & 4 & 5 \\ 0 & 6 & 7 \end{bmatrix} \xrightarrow{snd=RIGHT\_BEHIND} G_{target} = \begin{bmatrix} 5 & 1 & 0 \\ 7 & 3 & 4 \\ 0 & 2 & 6 \end{bmatrix}$$

$$G_{source} = \begin{bmatrix} 1 & 2 & 0 \\ 3 & 4 & 5 \\ 0 & 6 & 7 \end{bmatrix} \xrightarrow{snd=BEHIND} G_{target} = \begin{bmatrix} 6 & 7 & 0 \\ 5 & 1 & 2 \\ 0 & 3 & 4 \end{bmatrix}$$

$$G_{source} = \begin{bmatrix} 1 & 2 & 0 \\ 3 & 4 & 5 \\ 0 & 6 & 7 \end{bmatrix} \xrightarrow{snd=LEFT\_BEHIND} G_{target} = \begin{bmatrix} 7 & 3 & 0 \\ 1 & 2 & 6 \\ 0 & 4 & 5 \end{bmatrix}$$

Applying the same procedure to the exemplificative hexagonal grid arrangement 900 illustrated in FIG. 9, the source development identification matrix $G'_{source}$ becomes the following one:

$$G'_{source} = \begin{bmatrix} 1 & 2 & 3 & 4 & 5 & 6 & 7 & 8 & 9 & 10 \\ 3 & 4 & 5 & 6 & 7 & 8 & 9 & 10 & 1 & 2 \\ 5 & 6 & 7 & 8 & 9 & 10 & 1 & 2 & 3 & 4 \\ 7 & 8 & 9 & 10 & 1 & 2 & 3 & 4 & 5 & 6 \\ 9 & 10 & 1 & 2 & 3 & 4 & 5 & 6 & 7 & 8 \\ 1 & 2 & 3 & 4 & 5 & 6 & 7 & 8 & 9 & 10 \\ 3 & 4 & 5 & 6 & 7 & 8 & 9 & 10 & 1 & 2 \\ 5 & 6 & 7 & 8 & 9 & 10 & 1 & 2 & 3 & 4 \\ 7 & 8 & 9 & 10 & 1 & 2 & 3 & 4 & 5 & 6 \\ 9 & 10 & 1 & 2 & 3 & 4 & 5 & 6 & 7 & 8 \end{bmatrix}$$

Figure 10:
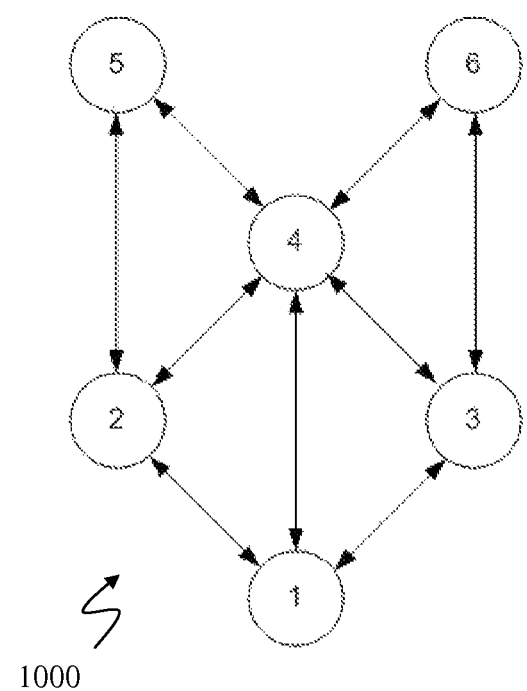
FIG. 10 is a top view of an exemplary "V" grid arrangement wherein items of the 3D menu according to a further embodiment of the present invention can be located.

A further alternative items arrangement that can be replicated so as to obtain a continuous development according to an embodiment of the present invention is shown in FIG. 10. Specifically, in the embodiment illustrated in FIG. 10, six items 1, 2, . . . of a 3D menu are arranged within the 3D virtual environment according to a "V" grid arrangement 1000. The "V" grid arrangement 1000 illustrated in FIG. 10 is substantially equal to the hexagonal grid arrangement 700 having a rhomboidal pattern already illustrated in FIG. 7, with the difference that "V" grid arrangement 1000 lacks the item located at the top (specifically, making reference to the grid 400 illustrated in FIG. 4, the one corresponding to the ninth item location L9).

Figure 11A:
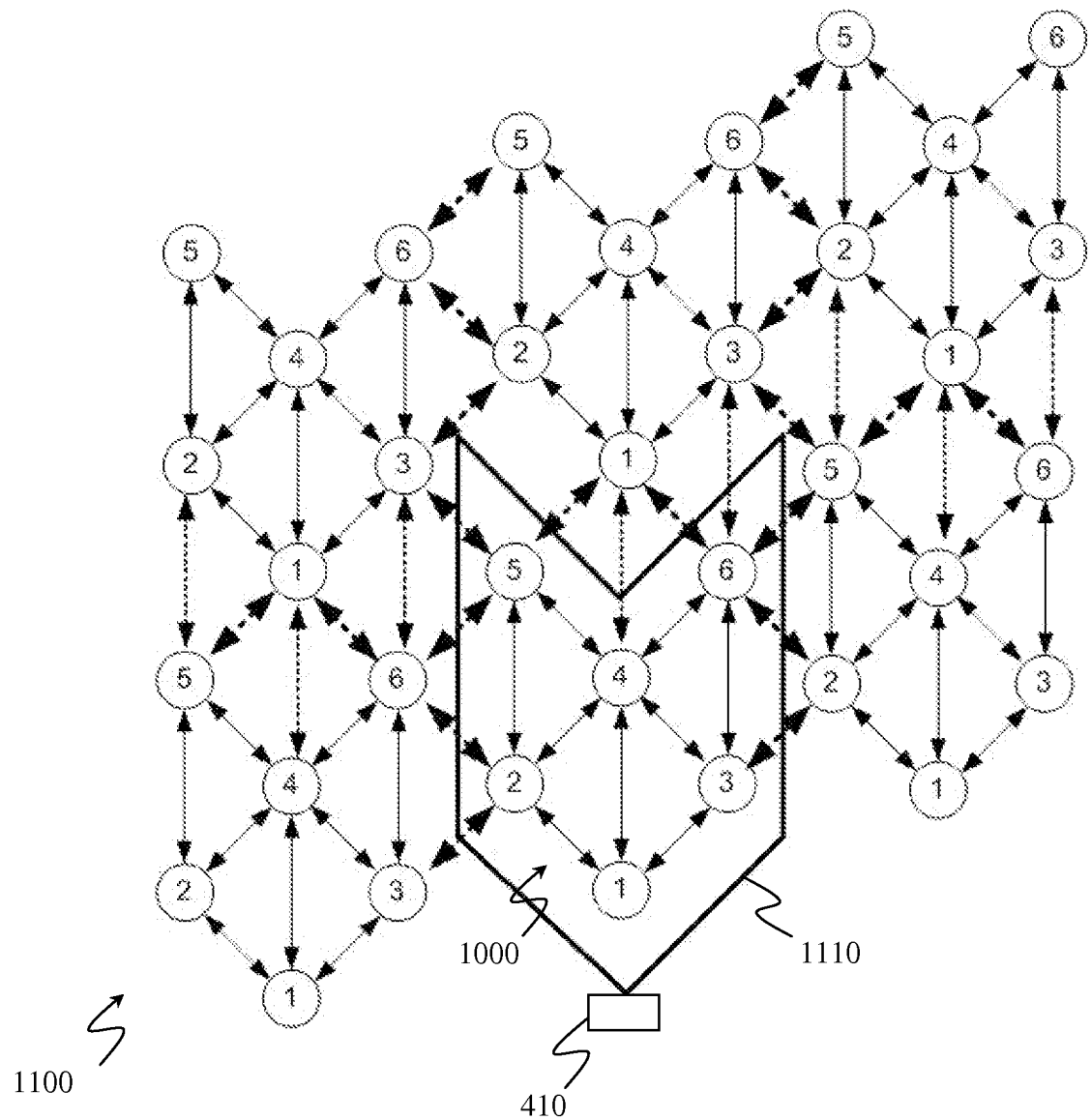
FIG. 11A depicts a development of the item arrangement illustrated in FIG. 10 obtained by replicating the item arrangement along the predetermined navigation directions.

The "V" grid arrangement 1000 illustrated in FIG. 10 as well is provided with a certain symmetry along the navigation directions, which allows to obtain a continuous development when replicated therealong; specifically, said development is illustrated in FIG. 11A with the reference 1100. In the same way as the previously described developments, the border items of each arrangement 1000 replica are connected with respective border items of the adjacent replicas through respective border affordances (represented in figure by means of dashed arrows).

At the beginning of the navigation, the virtual camera 410 is located so as to have the item 1 of a generic item arrangement 1000 replica (e.g., the one located in the lowest portion of the development 1000) in the close-up. The view of the virtual camera 410—delimited by the frame identified with the reference 1110—is such to include only the items 1, 2, . . . of said specific item arrangement 1000 replica, excluding any other items which belong to other item arrangement replicas.

Figure 11B:
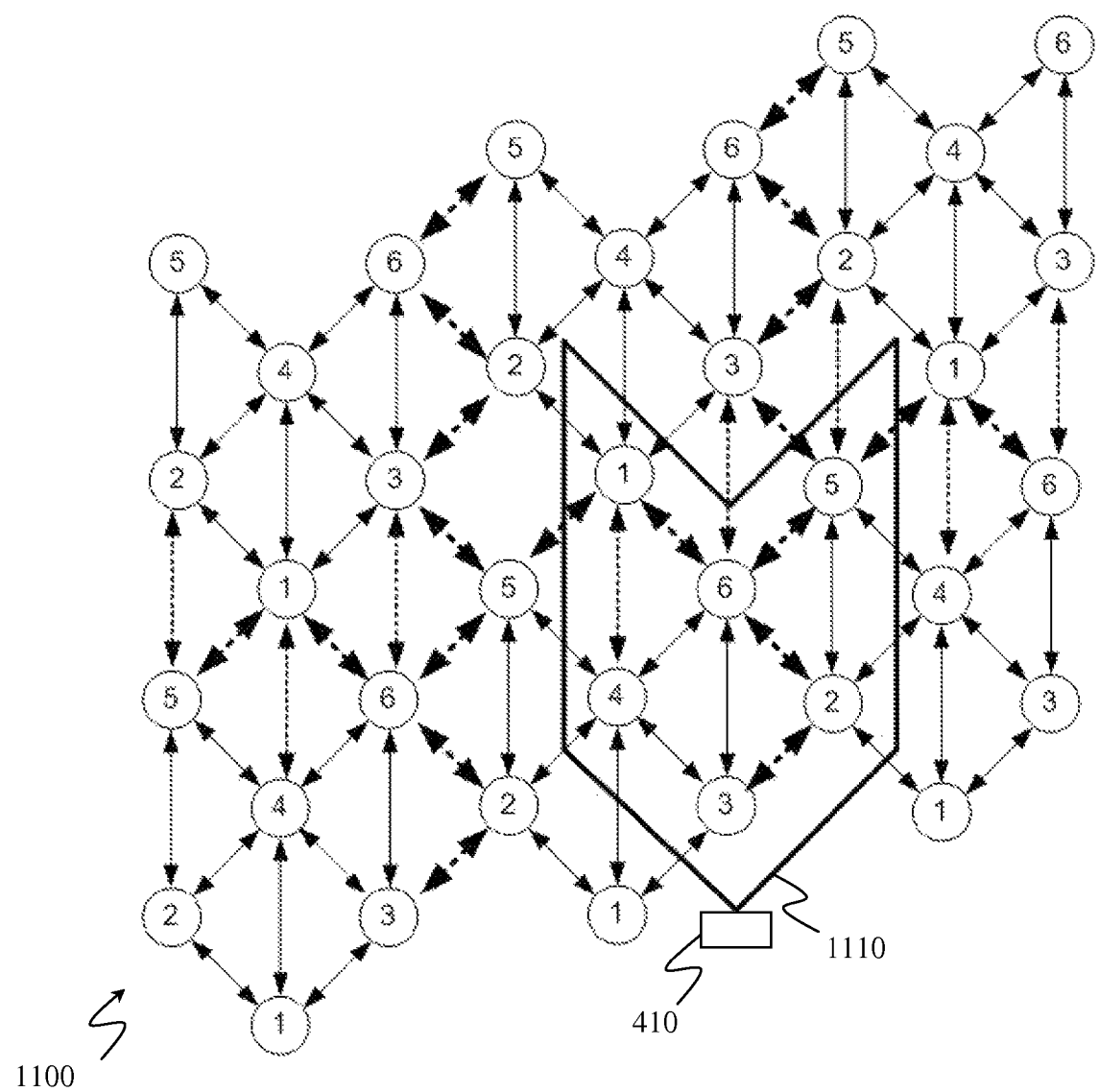
FIG. 11B depicts the development of FIG. 11A after a virtual camera movement performed according to a navigation direction.

Assuming now to carry out a virtual camera 410 movement according to the navigation direction RIGHT_AHEAD for selecting the item 3, the frame 1110 is accordingly shifted as illustrated in FIG. 11B. Making reference to the example at issue, it can be observed that the items 1, 2, and 5 that were shot by the virtual camera 410 during the previous navigation step, have now been advantageously relocated to reappear within the frame 1110.

Figure 12:
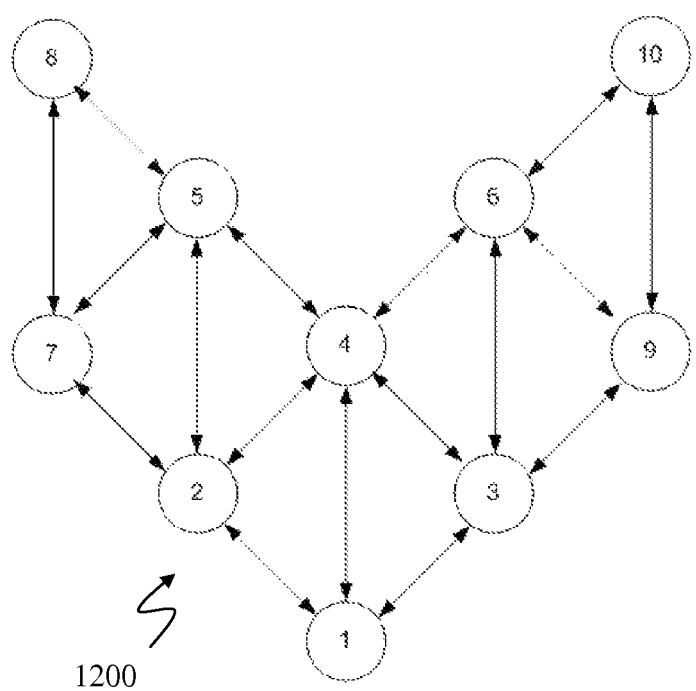
FIG. 12 is a top view of another exemplificative "V" grid arrangement according to an embodiment of the present invention.

Another exemplificative "V" grid arrangement is illustrated in FIG. 12 with the reference 1200. In this case, the arrangement is formed by ten items 1, 2, . . . .

In the same way as for the previously described items arrangements, the items of the "V" grid arrangement are located in corresponding item locations of a corresponding grid (not illustrated) within the 3D virtual environment. Even in this case, according to an embodiment of the present invention such grid and the way the items of the 3D menu are arranged on locations thereof are defined through the location matrix P and the identification matrix G.

Specifically, in order to generate a "V" grid arrangement, the cardinality n of items 1, 2, . . . has to be equal to:

$$n = s \cdot k,$$

wherein s=3, 5, 7 . . . and k=2, 3, 4 . . . .

For example:
s=3, k=2→n=6
s=3, k=3→n=9
s=3, k=4→n=12
s=5, k=2→n=10
s=5, k=3→n=15

The cases wherein n is equal to 6 and 10 have been already illustrated in the FIGS. 10 and 12, respectively.

The matrixes G and P of the exemplary "V" grid arrangement 1000 illustrated in FIG. 10 are the following ones:

$$G = \begin{bmatrix} 1 & 2 & 0 \\ 3 & 4 & 5 \\ 0 & 6 & 7 \end{bmatrix}$$

$$P = \begin{bmatrix} (0,0,0) & (-1,0,-1) & (-2,0,-2) \\ (1,0,-1) & (0,0,-2) & (-1,0,-3) \\ (2,0,-2) & (1,0,-3) & (0,0,-4) \end{bmatrix}.$$

It can be appreciated that this location matrix P coincides to the one corresponding to the rhomboidal grid arrangement, and that the elements G(0,2), G(2,0) and G(2,2) of the identification matrix G are equal to zero. This means that the six items 1, 2, . . . of the "V" grid arrangement 1000 are located on six selected item locations of a nine item locations grid equal to the one that has been previously described for the rhomboidal grid arrangement. This implies that three item locations of the grid are left empty. The item locations left empty are those identified by elements of the location matrix P that correspond to elements of the identification matrix G equal to zero (in the example at issue, the item locations corresponding to the coordinates (1, 0, −2), (−2, 0, −2) and (0,0,−4)).

By adopting the same procedure previously employed for the hexagonal grid arrangement 700 having a rhomboidal pattern, the source development identification matrix $G'_{source}$ corresponding to the development 1100 illustrated in FIG. 11A is:

$$G'_{source} = \begin{bmatrix} 1 & 2 & 3 & 4 & 5 & 6 \\ 3 & 4 & 5 & 6 & 1 & 2 \\ 5 & 6 & 1 & 2 & 3 & 4 \\ 1 & 2 & 3 & 4 & 5 & 6 \\ 3 & 4 & 5 & 6 & 1 & 2 \\ 5 & 6 & 1 & 2 & 3 & 4 \end{bmatrix}$$

Moreover, starting from the source identification matrix $G_{source}$ corresponding to the situation illustrated in FIG. 11A (item 1 in the close-up of the virtual camera 410), the target identification matrixes $G_{target}$ corresponding to movements performed along the six navigation directions are the following ones:

$$G_{source} = \begin{bmatrix} 1 & 2 & 0 \\ 3 & 4 & 5 \\ 0 & 6 & 0 \end{bmatrix} \xrightarrow{snd=LEFT\_AHEAD} G_{target} = \begin{bmatrix} 2 & 3 & 0 \\ 4 & 5 & 6 \\ 0 & 1 & 0 \end{bmatrix}$$

$$G_{source} = \begin{bmatrix} 1 & 2 & 0 \\ 3 & 4 & 5 \\ 0 & 6 & 0 \end{bmatrix} \xrightarrow{snd=RIGHT\_AHEAD} G_{target} = \begin{bmatrix} 3 & 4 & 0 \\ 6 & 1 & 2 \\ 0 & 3 & 0 \end{bmatrix}$$

$$G_{source} = \begin{bmatrix} 1 & 2 & 0 \\ 3 & 4 & 5 \\ 0 & 6 & 0 \end{bmatrix} \xrightarrow{snd=AHEAD} G_{target} = \begin{bmatrix} 4 & 5 & 0 \\ 6 & 1 & 2 \\ 0 & 3 & 0 \end{bmatrix}$$

$$G_{source} = \begin{bmatrix} 1 & 2 & 0 \\ 3 & 4 & 5 \\ 0 & 6 & 0 \end{bmatrix} \xrightarrow{snd=RIGHT\_BEHIND} G_{target} = \begin{bmatrix} 6 & 1 & 0 \\ 2 & 3 & 4 \\ 0 & 5 & 0 \end{bmatrix}$$

$$G_{source} = \begin{bmatrix} 1 & 2 & 0 \\ 3 & 4 & 5 \\ 0 & 6 & 0 \end{bmatrix} \xrightarrow{snd=BEHIND} G_{target} = \begin{bmatrix} 4 & 5 & 0 \\ 6 & 1 & 2 \\ 0 & 3 & 0 \end{bmatrix}$$

$$G_{source} = \begin{bmatrix} 1 & 2 & 0 \\ 3 & 4 & 5 \\ 0 & 6 & 0 \end{bmatrix} \xrightarrow{snd=LEFT\_BEHIND} G_{target} = \begin{bmatrix} 5 & 6 & 0 \\ 1 & 2 & 3 \\ 0 & 6 & 0 \end{bmatrix}$$

Figure 13:
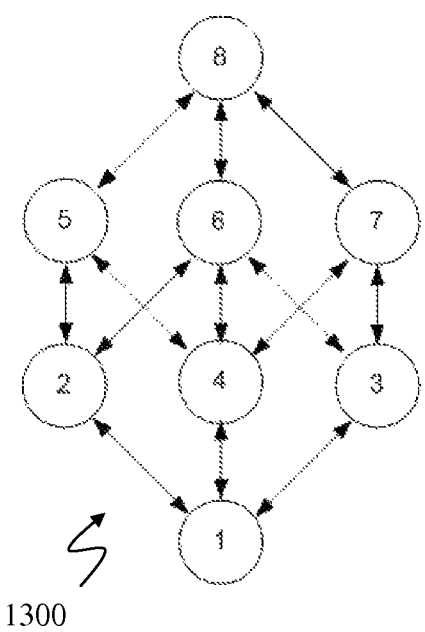
FIG. 13 is a top view of an exemplary hexagonal grid arrangement having a square pattern wherein items of the 3D menu according to a further embodiment of the present invention can be located.

A still further alternative items arrangement that can be replicated so as to obtain a continuous development according to an embodiment of the present invention is shown in FIG. 13. Specifically, in the embodiment illustrated in FIG. 13, eight items 1, 2, . . . of a 3D menu are arranged within the 3D virtual environment according to a hexagonal grid arrangement 1300 having a square pattern. Unlike the previously described items arrangements, the hexagonal grid arrangement 1300 illustrated in FIG. 13 is not based on a pattern of the rhomboidal type, but rather to a square one. The affordances among adjacent items are however defined in such a way to offer a navigation experience that is similar to that of the previous arrangement. The only substantial difference consists in that the distance between adjacent items along the AHEAD or BEHIND navigation directions is roughly halved compared to the previous cases.

Figure 14A:
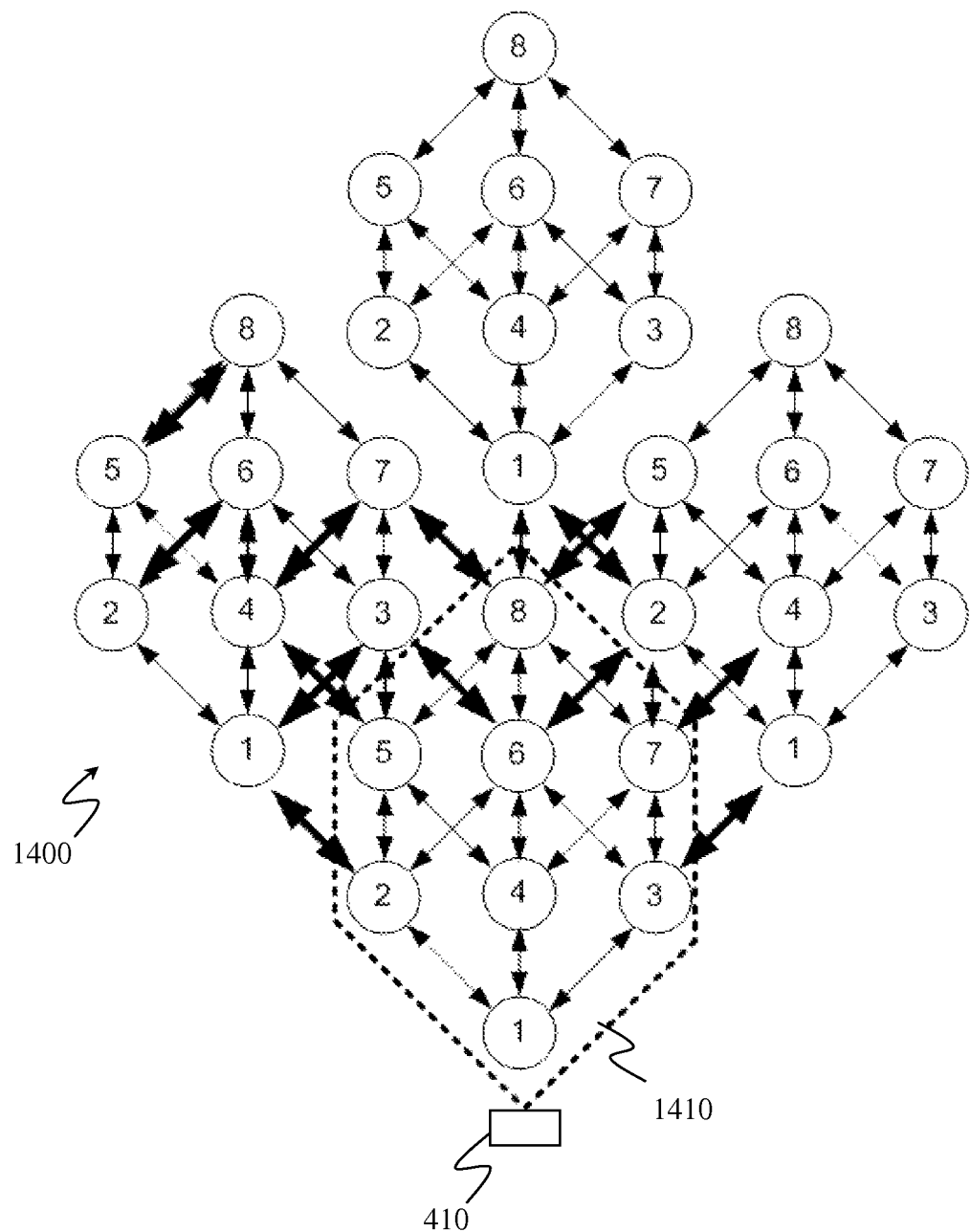
FIG. 14A depicts a development of the item arrangement of FIG. 13.

Also the hexagonal grid arrangement 1300 illustrated in FIG. 13 is provided with a certain symmetry along the navigation directions, which allows to obtain a continuous development when replicated therealong; specifically, said development is illustrated in FIG. 14A with the reference 1400. In the same way as the previously described developments, the border items of each arrangement 1400 replica are connected with respective border items of the adjacent replicas through respective border affordances (represented in figure by means of dashed arrows).

At the beginning of the navigation, the virtual camera 410 is located so as to have the item 1 of a generic item arrangement 1300 replica (e.g., the one located in the lowest portion of the development 1400) in the close-up. The view of the virtual camera 410—delimited by the frame identified with the reference 1410—is such to include only the items 1, 2, . . . of said specific item arrangement 1300 replica, excluding any other items which belong to other item arrangement replicas.

Figure 14B:
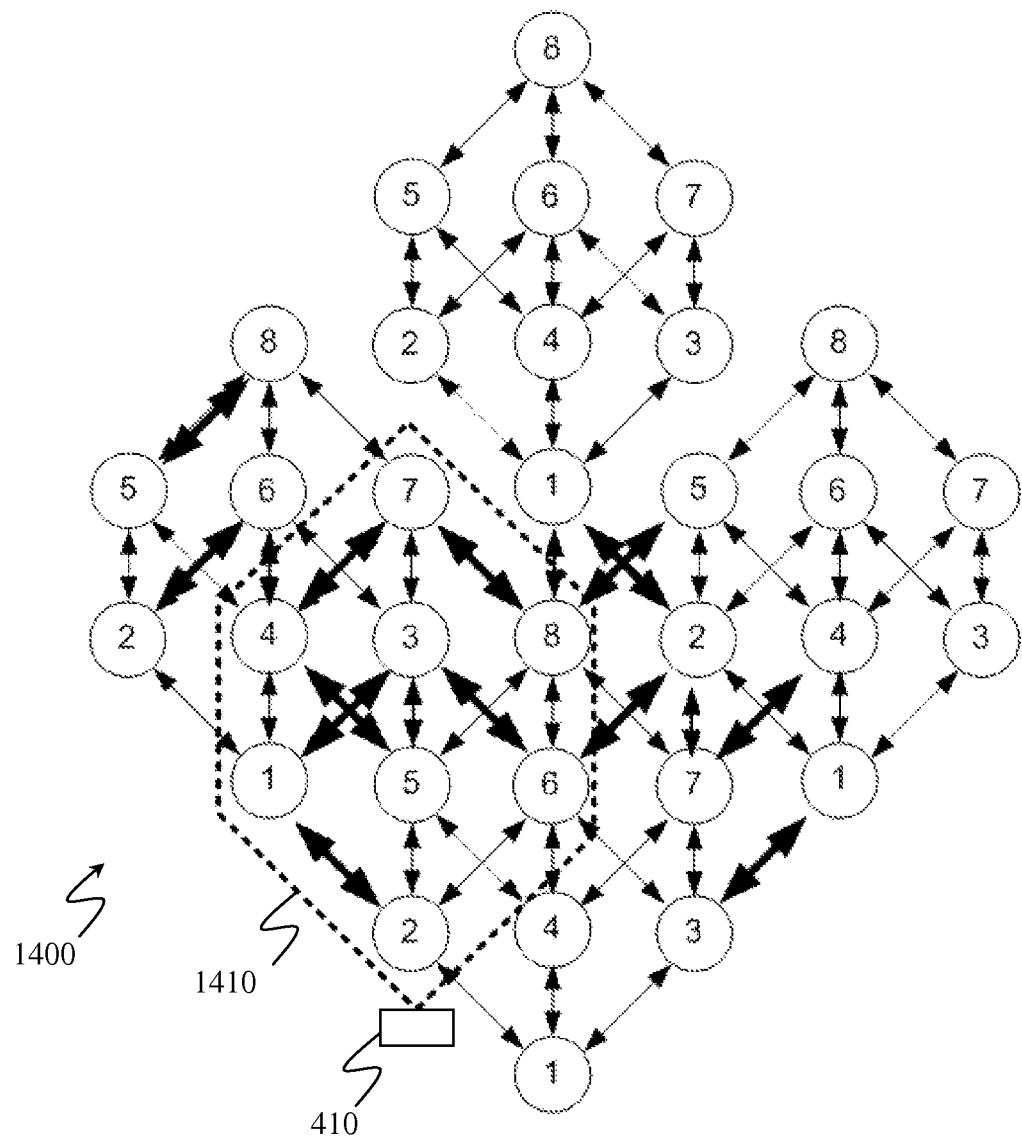
FIG. 14B depicts the development of FIG. 14A after a virtual camera movement performed according to a navigation direction.

Assuming now to carry out a virtual camera 410 movement according to the navigation direction LEFT_AHEAD for selecting the item 2, the frame 1410 is accordingly shifted as illustrated in FIG. 14B. Making reference to the example at issue, it can be observed that the items 1, 4, and 3 that were shot by the virtual camera 410 during the previous navigation step, have now been advantageously relocated to reappear within the frame 1410.

In the same way as for the previously described items arrangements, the items of the hexagonal grid arrangement having a square pattern are located in corresponding item locations of a corresponding grid (not illustrated) within the 3D virtual environment. Even in this case, according to an embodiment of the present invention such grid and the way the items of the 3D menu are arranged on locations thereof are defined through the location matrix P and the identification matrix G.

Specifically, in order to generate a hexagonal grid arrangement having a square pattern, the cardinality n of items 1, 2, . . . has to be equal to:

$$n = s \cdot k + 2 \cdot \sum_{i=1}^{s-2} i$$

wherein s=3, 5, 7 . . . , i is an odd number and k=1, 2, 3 . . . .

For example:
s=3, k=1→n=5
s=3, k=2→n=8
s=3, k=3→n=11
s=3, k=4→n=14
s=5, k=1→n=13

The case wherein n is equal to 8 is the one illustrated in the FIG. 13.

The matrixes G and P of the exemplary hexagonal grid arrangement 1300 having a square pattern illustrated in FIG. 13 are the following ones:

$$G = \begin{bmatrix} 1 & 0 & 2 & 0 \\ 0 & 4 & 0 & 5 \\ 3 & 0 & 6 & 0 \\ 0 & 7 & 0 & 8 \end{bmatrix}$$

$$P = \begin{bmatrix} (0,0,0) & (-1,0,-1) & (-2,0,-2) & (-3,0,-3) \\ (1,0,-1) & (0,0,-2) & (-1,0,-3) & (-2,0,-4) \\ (2,0,-2) & (1,0,-3) & (0,0,-4) & (-1,0,-5) \\ (3,0,-3) & (2,0,-4) & (1,0,-5) & (0,0,-6) \end{bmatrix}.$$

As expected, this location matrix P is substantially different with respect to the one corresponding to the rhomboidal grid arrangement; particularly, the corresponding grid (not illustrated) includes sixteen different item locations. Moreover, the identification matrix G as well includes sixteen elements, eight of which are equal to zero. This means that the eight items 1, 2, . . . of the hexagonal grid arrangement 1300 are located on eight selected item locations of the sixteen item locations grid identified by the location matrix P. This implies that eight item locations of the grid are left empty. The item locations left empty are those identified by elements of the location matrix P that correspond to elements of the identification matrix G equal to zero.

By adopting the same procedure previously employed for the hexagonal grid arrangement 700 having a rhomboidal pattern, the source development identification matrix $G'_{source}$ corresponding to the development 1400 illustrated in FIG. 14A is:

$$G'_{source} = \begin{bmatrix} 1 & 0 & 2 & 0 & 1 & 0 & 2 & 0 \\ 0 & 4 & 0 & 5 & 0 & 4 & 0 & 5 \\ 3 & 0 & 6 & 0 & 3 & 0 & 6 & 0 \\ 0 & 7 & 0 & 8 & 0 & 7 & 0 & 8 \\ 1 & 0 & 2 & 0 & 1 & 0 & 2 & 0 \\ 0 & 4 & 0 & 5 & 0 & 4 & 0 & 5 \\ 3 & 0 & 6 & 0 & 3 & 0 & 6 & 0 \\ 0 & 7 & 0 & 8 & 0 & 7 & 0 & 8 \end{bmatrix}$$

Again, by adopting the same procedure previously employed for the hexagonal grid arrangement 700 having a rhomboidal pattern, it is possible to obtain the identification matrix $G_i$ (i=1, 2, . . . , 8) corresponding to the case in which the generic i-th item 1, 2, . . . is in the close-up of the virtual camera 410. Specifically:

$$G = \begin{bmatrix} 1 & 0 & 2 & 0 \\ 0 & 4 & 0 & 5 \\ 3 & 0 & 6 & 0 \\ 0 & 7 & 0 & 8 \end{bmatrix}$$

$$G_2 = \begin{bmatrix} 2 & 0 & 1 & 0 \\ 0 & 5 & 0 & 4 \\ 6 & 0 & 3 & 0 \\ 0 & 8 & 0 & 7 \end{bmatrix}$$

$$G_3 = \begin{bmatrix} 3 & 0 & 6 & 0 \\ 0 & 7 & 0 & 8 \\ 1 & 0 & 2 & 0 \\ 0 & 4 & 0 & 5 \end{bmatrix}$$

$$G_4 = \begin{bmatrix} 4 & 0 & 5 & 0 \\ 0 & 6 & 0 & 3 \\ 7 & 0 & 8 & 0 \\ 0 & 2 & 0 & 1 \end{bmatrix}$$

$$G_5 = \begin{bmatrix} 5 & 0 & 4 & 0 \\ 0 & 3 & 0 & 6 \\ 8 & 0 & 7 & 0 \\ 0 & 1 & 0 & 2 \end{bmatrix}$$

$$G_6 = \begin{bmatrix} 6 & 0 & 3 & 0 \\ 0 & 8 & 0 & 7 \\ 2 & 0 & 1 & 0 \\ 0 & 5 & 0 & 4 \end{bmatrix}$$

$$G_7 = \begin{bmatrix} 7 & 0 & 8 & 0 \\ 0 & 2 & 0 & 1 \\ 4 & 0 & 5 & 0 \\ 0 & 6 & 0 & 3 \end{bmatrix}$$

$$G_8 = \begin{bmatrix} 8 & 0 & 7 & 0 \\ 0 & 1 & 0 & 2 \\ 5 & 0 & 4 & 0 \\ 0 & 3 & 0 & 6 \end{bmatrix}$$

According to a still further embodiment of the present invention, the items may be arranged according to a radial arrangement which is an improvement of the ring arrangement already mentioned in the introduction of the present invention. According to this embodiment, the items are arranged within the 3D virtual environment in concentric circles according to a trapezoidal pattern; each circle includes a same number of items.

Figure 15:
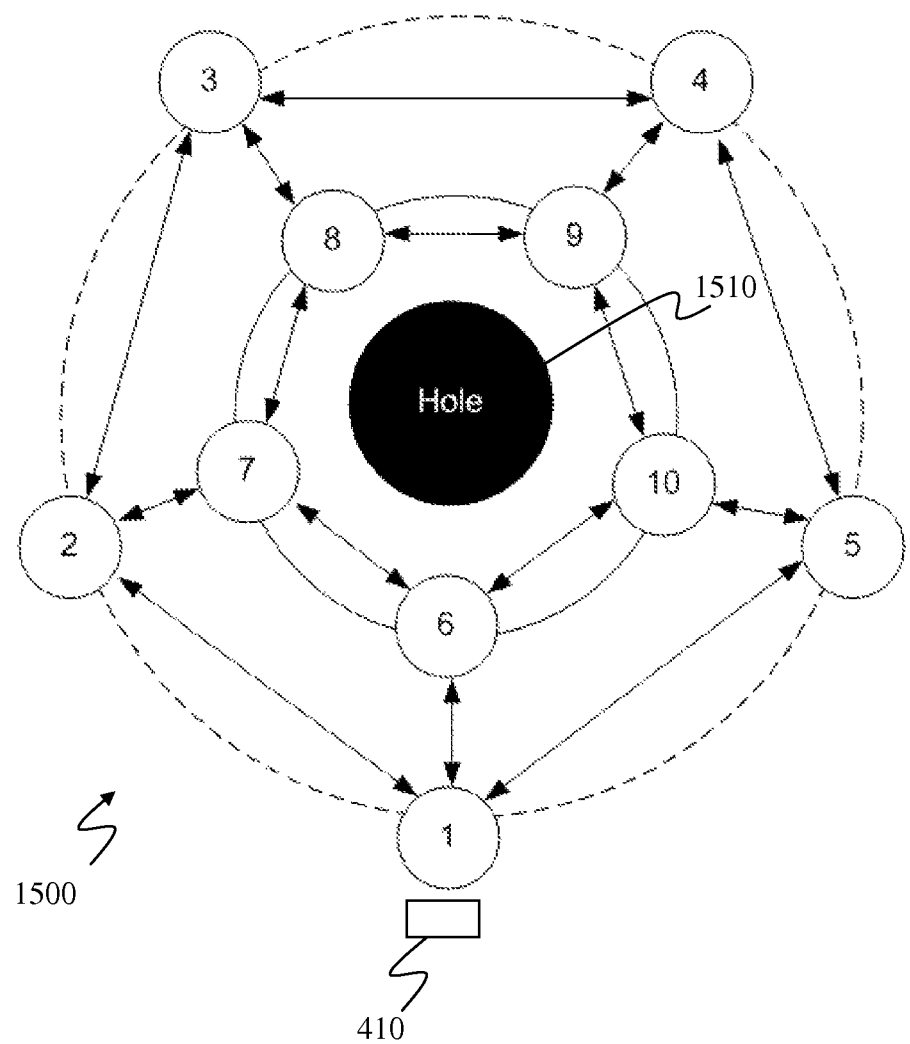
FIG. 15 is a top view of an exemplary radial arrangement according to a further embodiment of the present invention.

An example of such radial arrangement is illustrated in FIG. 15 with the reference 1500. This exemplary arrangement includes two concentric circles; the number of items 1, 2, ... in each circle is equal to five. The virtual camera 410 is located outside the radial arrangement 1500 in order to view all the items of the two circles in a same shot; the selected item is the one belonging to the outermost circle that is actually in the close-up of the virtual camera 410 (in the example illustrated in FIG. 15, the item 1). The affordances between adjacent items 1, 2, ... are defined in such a way to allow a circular navigation on concentric centers. Particularly, with an items arrangement of this peculiar type, the allowed navigation directions becomes only four, and specifically:

AHEAD
BEHIND
LEFT
RIGHT

The navigation directions LEFT and RIGHT allow to navigate along the outermost circle of the radial arrangement so as to change the item that is in the close-up of the virtual camera 410. A navigation step according to the navigation direction LEFT provides for the rotation of the whole radial arrangement 1500 anticlockwise around the center thereof, while a navigation step according to the navigation direction RIGHT provides for the rotation of the whole radial arrangement 1500 clockwise around the center thereof. The navigation directions AHEAD and BEHIND allow instead to exchange the positions of the items among the various circles of the arrangement. Particularly, a navigation step according to the navigation direction AHEAD provides for the relocation of the items that were located in each circle of the radial arrangement 1500 into the corresponding next outer circle of the arrangement (the items previously located in the outermost circle are instead relocated into the innermost one). A navigation step according to the navigation direction BEHIND provides instead for the relocation of the items that were located in each circle of the radial arrangement 1500 into the corresponding next inner circle of the arrangement (the items previously located in the innermost circle are instead relocated into the outermost circle).

In order to emphasize that the navigation is of a circular type, the center of the radial arrangement 1500 is visually depicted in the 3D virtual environment by means of a so called "hole" element, identified in figures with the reference 1510. Indeed, the abovementioned circular navigation can be regarded as if it were carried out on a toroid, whose center corresponds to the hole element 1510.

Figure 16:
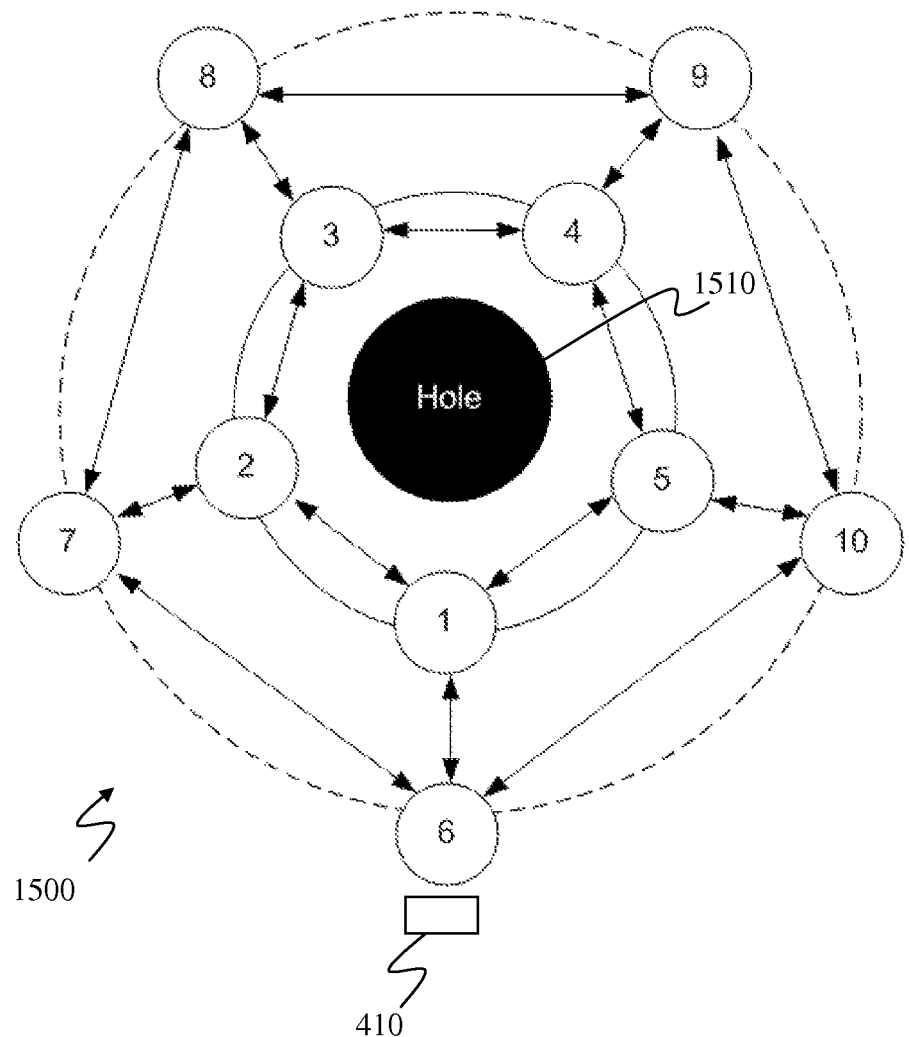
FIG. 16 is a top view of the radial arrangement of FIG. 15 after a navigation step performed according to a navigation direction.

Starting for example from the situation illustrated in FIG. 15, wherein the item that is in the close-up of the virtual camera 410 is the item 1, a navigation step according to the navigation direction AHEAD takes to the item relocations illustrated in FIG. 16, wherein the item that is in the close-up of the virtual camera 410 has became the item 6.

Unlike the previously proposed items arrangement, the radial arrangement 1500 is not replicated for obtaining a continuous development, since its circular nature makes such arrangement continuous for definition; as a consequences, in order to formalize how the navigation is performed within the radial arrangement 1500, an explicit navigation function NC will be introduced in the following of the present description.

The items of the radial arrangement are located in corresponding item locations within the 3D virtual environment. The positions of such item locations and the way the items of the 3D menu are arranged thereon are defined through the location matrix P and the identification matrix G.

The cardinality n of items 1, 2, ... forming a radial arrangement is obtained from the following formula:

$n = k \cdot d,$ wherein k represents the number of circles forming the arrangement, and d the cardinality thereof (i.e., the number of items per each circle). Potentially, both k and d may assume values starting from 1 to infinite. However, in order to exploit at best the 3D virtual environment space, it is preferred to have:

k=2, 3, 4, 5K
d=4, 5, 6, 7K

Moreover, still for exploit at best the 3D virtual environment space, it is preferable to employ values of k and d that are as close as possible. For example, an item arrangement including n=20 items arranged on k=4 concentric circles of d=5 items each is more efficient (from a space occupation point of view) than an item arrangement including the same n=20 items, but located on k=2 concentric circles of d=10 items each.

Examples of possible cardinalities n may be:

d=4, k=2→n=8
d=4, k=3→n=12
d=4, k=4→n=16
d=5, k=2→n=10
d=5, k=3→n=15

The identification matrix G of a radial arrangement is generated in the same way as the previously described identification matrixes G, provided that:

the navigation direction LEFT has to be considered to all intents and purposes as the navigation direction LEFT_AHEAD used in the previously described arrangements, and the navigation direction RIGHT has to be considered to all intents and purposes as the navigation direction RIGHT_AHEAD used in the previously described arrangements.

Making reference to the exemplary radial arrangement 1500 illustrated in FIG. 15, the identification matrix G is the following one:

$$G = \begin{bmatrix} 1 & 2 & 3 & 4 & 5 \\ 6 & 7 & 8 & 9 & 10 \end{bmatrix}$$

The element G(0,0) corresponds to the item actually in the close-up of the virtual camera 410; the elements belonging to the first row correspond to the items actually located in the outermost circle of the arrangement, while the elements belonging to the last row correspond to the items actually located in the innermost circle of the arrangement.

The location matrix P provides instead the coordinates in the 3D virtual environment of item locations that occupy vertexes of regular polygons having a number of edges equal to d and respective circumscribed circles coinciding to the circles of the arrangement. A possible location matrix P corresponding to the example at issue may be the following one:

$$P = \begin{bmatrix} (0,0,0) & (-2.75,0,-2) & (-1.75,0,-5) & (1.75,0,-5) & (2.75,0,-2) \\ (0,0,-1.5) & (-1.25,0,-2.5) & (-0.75,0,-4) & (0.75,0,-4) & (1.25,0,-2.5) \end{bmatrix}$$

Given that the identification matrix G is an r-by-c matrix, according to an embodiment of the present invention the cyclic navigation function NC that allows to generate a target identification matrix $G_{target}$ from a source identification matrix $G_{source}$ according to a selected navigation direction snd is the following one:

$$NC: (i,j) \xrightarrow{snd} (p,q):$$
$$\forall i: i \in [0, r-1]$$
$$\forall j: j \in [0, d-1]$$
$$G_{target}(i,j) = G_{source}(p,q);$$

if $snd$ is LEFT: $\begin{cases} p = i \\ q = (j+1) \bmod c \end{cases}$ if $snd$ is RIGHT: $\begin{cases} p = i \\ q = (j+c-1) \bmod c \end{cases}$ if $snd$ is AHEAD: $\begin{cases} p = (i+1) \bmod r \\ q = j \end{cases}$ if $snd$ is BEHIND: $\begin{cases} p = (i+r-1) \bmod r \\ q = j \end{cases}$ wherein "mod" is the modulo operator.

Making reference to the situation illustrated in FIG. 15, the source identification matrix G is the following one:

$$G_{source} = \begin{bmatrix} 1 & 2 & 3 & 4 & 5 \\ 6 & 7 & 8 & 9 & 10 \end{bmatrix}$$

In order to select the item 2, the user has to submit the navigation direction LEFT. Thus, by applying the cyclic navigation function NC to the above source identification matrix $G_{source}$ with snd=LEFT_AHEAD, the resulting target identification matrix $G_{target}$ is:

$$G_{source} = \begin{bmatrix} 1 & 2 & 3 & 4 & 5 \\ 6 & 7 & 8 & 9 & 10 \end{bmatrix} \xrightarrow{snd=LEFT} G_{target} = \begin{bmatrix} 2 & 3 & 4 & 5 & 1 \\ 7 & 8 & 9 & 10 & 6 \end{bmatrix}$$

As expected, the item identified by the element $G_{target}(0,0)$ is the item 2, being now in the close-up of the virtual camera 410.

By applying instead the cyclic navigation function NC to the beginning source identification matrix $G_{source}$ with snd=RIGHT, the resulting target identification matrix $G_{target}$ become:

$$G_{source} = \begin{bmatrix} 1 & 2 & 3 & 4 & 5 \\ 6 & 7 & 8 & 9 & 10 \end{bmatrix} \xrightarrow{snd=RIGHT} G_{target} = \begin{bmatrix} 5 & 1 & 2 & 3 & 4 \\ 10 & 6 & 7 & 8 & 9 \end{bmatrix}$$

Moreover, by applying the cyclic navigation function NC to the beginning source identification matrix $G_{source}$ with snd=AHEAD, the resulting target identification matrix $G_{target}$ becomes:

$$G_{source} = \begin{bmatrix} 1 & 2 & 3 & 4 & 5 \\ 6 & 7 & 8 & 9 & 10 \end{bmatrix} \xrightarrow{snd=AHEAD} G_{target} = \begin{bmatrix} 6 & 7 & 8 & 9 & 10 \\ 1 & 2 & 3 & 4 & 5 \end{bmatrix}$$

Finally, by applying the cyclic navigation function NC to the beginning source identification matrix $G_{source}$ with snd=BEHIND, the resulting target identification matrix $G_{target}$ becomes:

$$G_{source} = \begin{bmatrix} 1 & 2 & 3 & 4 & 5 \\ 6 & 7 & 8 & 9 & 10 \end{bmatrix} \xrightarrow{snd=BEHIND} G_{target} = \begin{bmatrix} 6 & 7 & 8 & 9 & 10 \\ 1 & 2 & 3 & 4 & 5 \end{bmatrix}$$

The identification matrixes $G_i$ (i=1, 2, ..., 10) corresponding to the cases in which the generic i-th items 1, 2, ... are in the close-up of the virtual camera 410 are:

$$G_1 = \begin{bmatrix} 1 & 2 & 3 & 4 & 5 \\ 6 & 7 & 8 & 9 & 10 \end{bmatrix}$$

$$G_2 = \begin{bmatrix} 2 & 3 & 4 & 5 & 1 \\ 7 & 8 & 9 & 10 & 6 \end{bmatrix}$$

$$G_3 = \begin{bmatrix} 3 & 4 & 5 & 1 & 2 \\ 8 & 9 & 10 & 6 & 7 \end{bmatrix}$$

$$G_4 = \begin{bmatrix} 4 & 5 & 1 & 2 & 3 \\ 9 & 10 & 6 & 7 & 8 \end{bmatrix}$$

$$G_5 = \begin{bmatrix} 5 & 1 & 2 & 3 & 4 \\ 10 & 6 & 7 & 8 & 9 \end{bmatrix}$$

$$G_6 = \begin{bmatrix} 6 & 7 & 8 & 9 & 10 \\ 1 & 2 & 3 & 4 & 5 \end{bmatrix}$$

$$G_7 = \begin{bmatrix} 7 & 8 & 9 & 10 & 6 \\ 2 & 3 & 4 & 5 & 1 \end{bmatrix}$$

$$G_8 = \begin{bmatrix} 8 & 9 & 10 & 6 & 7 \\ 3 & 4 & 5 & 1 & 2 \end{bmatrix}$$

$$G_9 = \begin{bmatrix} 9 & 10 & 6 & 7 & 8 \\ 4 & 5 & 1 & 2 & 3 \end{bmatrix}$$

$$G_{10} = \begin{bmatrix} 10 & 6 & 7 & 8 & 9 \\ 5 & 1 & 2 & 3 & 4 \end{bmatrix}$$

According to a still further embodiment of the present invention, the items are still arranged according to a radial arrangement similar to the one illustrated in FIG. 15—i.e., concentric circles—, but in this case the items 1, 2, . . . are located only on the halves of the circles which are in the proximity of the virtual camera.

Figure 17:
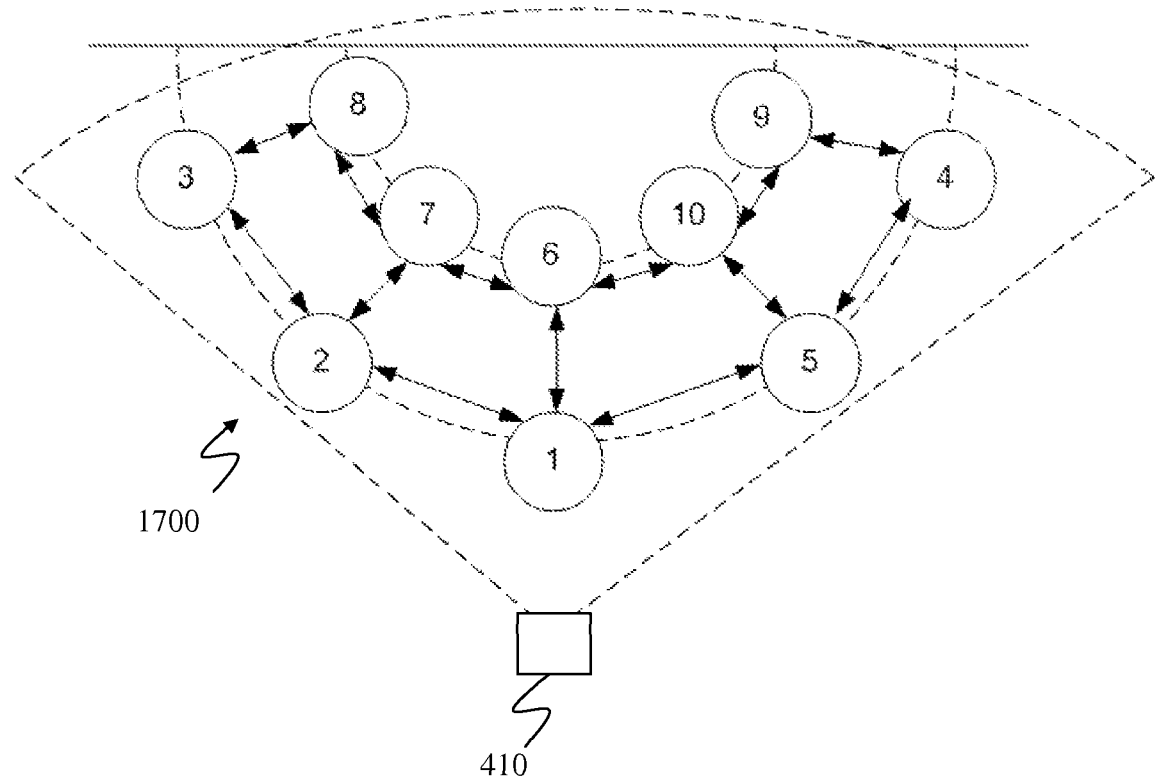
FIG. 17 is a top view of an exemplary semi-radial arrangement according to a further embodiment of the present invention.

An example of such items arrangement, herein referred to as semi-radial arrangement, is illustrated in FIG. 17 with the reference 1700. This exemplary arrangement includes two concentric circles; the number of items 1, 2, . . . in each circle is equal to five. The virtual camera 410 is located outside the radial arrangement 1500 in order to view all the items of the two circles in a same shot; the selected item is the one belonging to the outermost circle that is actually in the close-up of the virtual camera 410 (in the example illustrated in FIG. 17, the item 1). Compared to the case illustrated in FIG. 15—which includes ten items 1, 2, . . . as well—the items 1, 2, . . . are closer to each other, being located on semicircles instead of being located on complete circles. Even in this case the affordances between adjacent items 1, 2, . . . are defined in such a way to allow a circular navigation on concentric centers, and the allowed navigation directions are AHEAD, BEHIND, LEFT and RIGHT.

The navigation directions AHEAD and BEHIND allow to exchange the positions of the items among the various circles of the arrangement. Particularly, a navigation step according to the navigation direction AHEAD provides for the relocation of the items that were located in each circle of the semi-radial arrangement 1700 into the corresponding next outer circle of the arrangement (the items previously located in the outermost circle are instead relocated into the innermost one). A navigation step according to the navigation direction BEHIND provides instead for the relocation of the items that were located in each circle of the semi-radial arrangement 1700 into the corresponding next inner circle of the arrangement (the items previously located in the innermost circle are instead relocated into the outermost circle).

Figure 18:
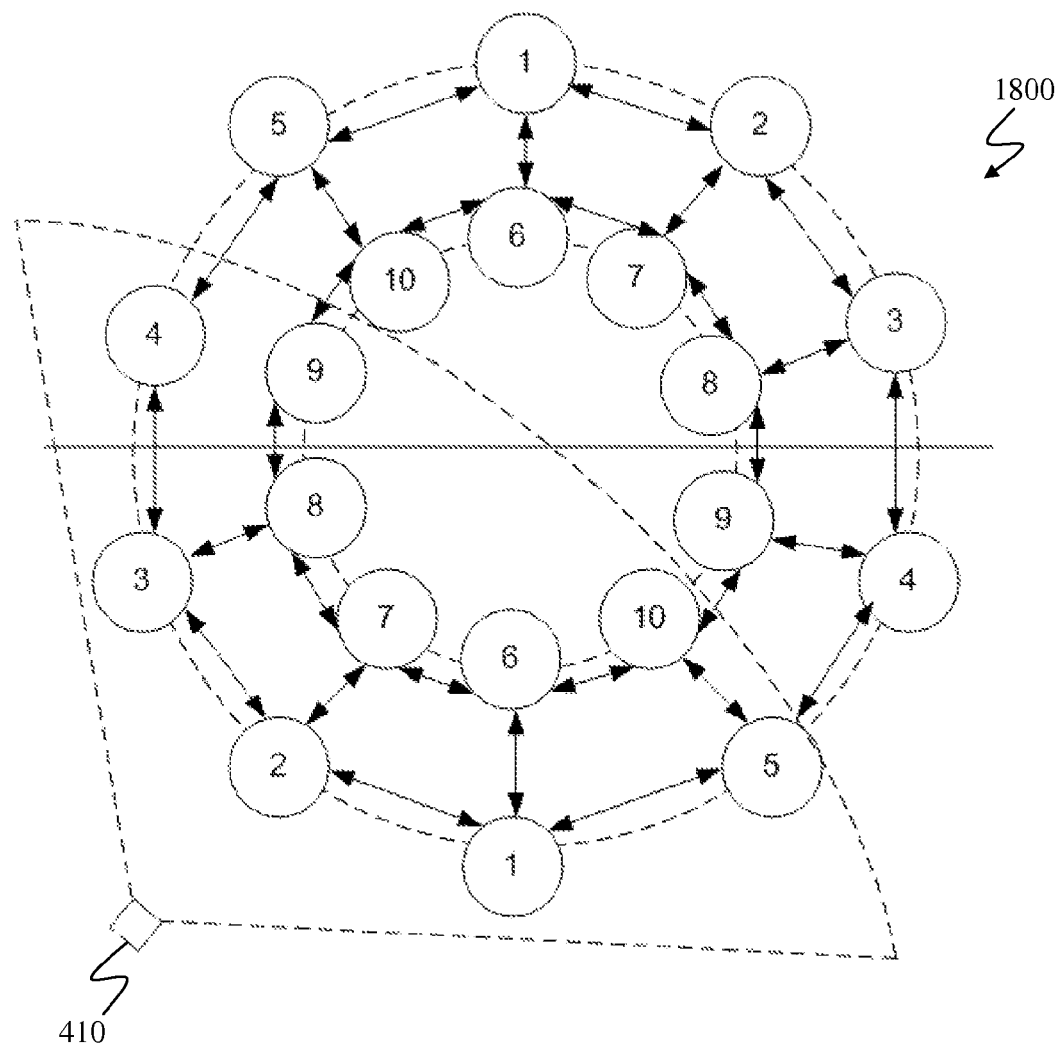
FIG. 18 depicts a development of the arrangement of FIG. 17.

The navigation directions LEFT and RIGHT allow to navigate along the outermost circle of the semi-radial arrangement so as to change the item that is in the close-up of the virtual camera 410. A navigation step according to the navigation direction LEFT provides for the rotation of the whole semi-radial arrangement 1700 anticlockwise around the center thereof, while a navigation step according to the navigation direction RIGHT provides for the rotation of the whole semi-radial arrangement 1700 clockwise around the center thereof. However, with this peculiar items arrangement the navigation according to the navigation directions LEFT and RIGHT provides for the symmetric replication (doubling) of the items of the arrangement so as obtain a continuous development in which the concentric circles are complete, and not halved. Such continuous development is illustrated in FIG. 18 with the reference 1800. The development 1800 corresponds to the situation obtained after performing a navigation step according to the navigation direction LEFT starting from the situation depicted in FIG. 17. The item actually selected is the item 2, being in the close-up of the virtual camera 410. As can be observed in the FIG. 18, the items 1, 2, . . . actually displayed among those forming the whole development 1800 are those that are actually shot by the virtual camera 410; specifically, the shot of the virtual camera 410 is such to comprise just the ten items 1, 2, . . . located on the halves of the concentric circles which are in the proximity of the virtual camera.

The items of the semi-radial arrangement are located in corresponding item locations within the 3D virtual environment. The positions of such item locations and the way the items of the 3D menu are arranged thereon are defined through the location matrix P and the identification matrix G.

Even in this case the cardinality n of items 1, 2, . . . forming a semi-radial arrangement is obtained from the following formula:

$n = k \cdot d,$ wherein k represents the number of circles forming the arrangement, and d the cardinality thereof (i.e., the number of items per each circle). Potentially, both k and d may assume values starting from 1 to infinite. However, in order to exploit at best the 3D virtual environment space, it is preferred to have:

k=2, 3, 4, 5K
d=4, 5, 6, 7K

Moreover, still for exploiting at best the 3D virtual environment space, it is preferable to employ values of k and d that are as close as possible. For example, an item arrangement including n=20 items arranged on k=4 concentric circles of d=5 items each is more efficient (from a space occupation point of view) than an item arrangement including the same n=20 items, but located on k=2 concentric circles of d=10 items each.

Examples of possible cardinalities n may be:
d=4, k=2→n=8
d=4, k=3→n=12
d=4, k=4→n=16
d=5, k=2→n=10
d=5, k=3→n=15

The identification matrix G of a semi-radial arrangement is generated in the same way as the identification matrix G of the radial arrangement 1500.

Making reference to the exemplary radial arrangement 1700 illustrated in FIG. 17, the identification matrix G is the following one:

$$G = \begin{bmatrix} 1 & 2 & 3 & 4 & 5 \\ 6 & 7 & 8 & 9 & 10 \end{bmatrix}$$

The element G(0,0) corresponds to the item actually in the close-up of the virtual camera 410; the elements belonging to the first row correspond to the items actually located in the outermost circle of the arrangement, while the elements belonging to the last row correspond to the items actually located in the innermost circle of the arrangement.

The location matrix P provides instead the coordinates in the 3D virtual environment of item locations that occupy vertexes of regular polygons having a number of edges equal to 2 d and respective circumscribed circles coinciding to the circles of the arrangement.

Exploiting the same procedure used for the radial arrangement, it is possible to obtain the identification matrixes $G_i$ (i=1, 2, . . . , 10) corresponding to the cases in which the generic i-th items 1, 2, . . . are in the close-up of the virtual camera. More specifically, said identification matrixes $G_i$ are:

$$G_1 = \begin{bmatrix} 1 & 2 & 3 & 4 & 5 \\ 6 & 7 & 8 & 9 & 10 \end{bmatrix}$$

-continued $$G_2 = \begin{bmatrix} 2 & 3 & 4 & 5 & 1 \\ 7 & 8 & 9 & 10 & 6 \end{bmatrix}$$

$$G_3 = \begin{bmatrix} 3 & 4 & 5 & 1 & 2 \\ 8 & 9 & 10 & 6 & 7 \end{bmatrix}$$

$$G_4 = \begin{bmatrix} 4 & 5 & 1 & 2 & 3 \\ 9 & 10 & 6 & 7 & 8 \end{bmatrix}$$

$$G_5 = \begin{bmatrix} 5 & 1 & 2 & 3 & 4 \\ 10 & 6 & 7 & 8 & 9 \end{bmatrix}$$

$$G_6 = \begin{bmatrix} 6 & 7 & 8 & 9 & 10 \\ 1 & 2 & 3 & 4 & 5 \end{bmatrix}$$

$$G_7 = \begin{bmatrix} 7 & 8 & 9 & 10 & 6 \\ 2 & 3 & 4 & 5 & 1 \end{bmatrix}$$

$$G_8 = \begin{bmatrix} 8 & 9 & 10 & 6 & 7 \\ 3 & 4 & 5 & 1 & 2 \end{bmatrix}$$

$$G_9 = \begin{bmatrix} 9 & 10 & 6 & 7 & 8 \\ 4 & 5 & 1 & 2 & 3 \end{bmatrix}$$

$$G_{10} = \begin{bmatrix} 10 & 6 & 7 & 8 & 9 \\ 5 & 1 & 2 & 3 & 4 \end{bmatrix}$$

Summarizing, with the various items arrangements according to the embodiments of the present invention that have been described in the previous, it is possible to implement a 3D menu including a number n of items equal to:

rhomboidal grid arrangement (R):

$n=s^2$ s=1, 2, 3Λ hexagonal grid arrangement having a rhomboidal pattern (Er):

$n=s^2-2\cdot\Sigma_{i=1}^{k} i$.

s=3, 4K k=1K⌊s/2⌋

"V" grid arrangement (V):

$n=s\cdot k$ s=3, 5, 7K k=1, 2, 3, 4K hexagonal grid arrangement having a square pattern (Eq):

$n=s\cdot k+2\cdot\Sigma_{i=1}^{s-2} i$ s=3, 5, 7K i=dispari k=1, 2, 3K radial arrangement (Rad):

$n=k\cdot d$ k=2, 3, 4, 5K d=4, 5, 6, 7K semi-radial arrangement (S-Rad):

$n=k\cdot d$ k=2, 3, 4, 5K d=4, 5, 6, 7K

A summarizing table corresponding to the cases from n=3 to n=20 is provided hereinbelow.

| n | R | Er | V | Eq | Rad | S-Rad |
|---|---|----|----|----|-----|-------|
| 3 |   |    | X |    |     |       |
| 4 | X |    |   |    |     |       |
| 5 |   |    | X | X  |     |       |
| 6 |   |    | X |    |     | X     |
| 7 |   | X  | X |    |     |       |
| 8 |   |    | X | X  | X   | X     |
| 9 | X |    | X |    |     | X     |
| 10 |  | X  | X |    | X   |       |
| 11 |  |    | X | X  |     |       |
| 12 |  |    | X |    | X   | X     |
| 13 |  |    | X | X  |     |       |
| 14 |  | X  |   | X  | X   | X     |
| 15 |  |    | X |    | X   | X     |
| 16 | X |    |   |    | X   | X     |
| 17 |  |    | X | X  |     |       |
| 18 |  |    | X | X  | X   | X     |
| 19 |  | X  | X |    |     |       |
| 20 |  |    | X |    | X   | X     |

As can be observed by such table, most specific n values are covered by more than one item arrangement. In this case, the choice of the item arrangement to be employed can be carried out according to aesthetic preferences.

The previous description presents and discusses in detail several embodiments of the present invention; nevertheless, several changes to the described embodiments, as well as different invention embodiments are possible, without departing from the scope defined by the appended claims.

The invention claimed is:

1. A method for navigating an interactive menu in a virtual environment, the interactive menu including a first number of selectable items, the method comprising:
   providing a grid on a delimited portion of a plane in the virtual environment, the grid including a second number of locations equal to said first number;
   providing a plurality of navigation directions within said grid;
   arranging each item of the menu on a respective location of the grid according to an item-grid arrangement, wherein adjacencies along said navigation directions among items located on the grid determine corresponding adjacency relationships, adjacency relationships being further determined along said navigation directions among items located on border locations of the grid which are situated on borders of said delimited portions;
   shooting a first item in the close-up to enable selection of said item;
   receiving a navigation command identifying a navigation direction along which a second item to be selected is located; and
   rearranging the item-grid arrangement to relocate the items in different locations of the grid based on the received navigation command in such a way to shoot the second item in the close-up, all of the selectable items being wholly visible on the interactive menu during and after altering of the item-grid arrangement, wherein
   said altering the item-grid arrangement preserves the adjacency relationships,
   wherein the grid is configured to have, along each navigation direction thereof, a respective fixed distance between each pair of adjacent locations along said navigation direction,
   wherein the grid is replicated on the plane along the navigation directions so as to obtain a continuous plane including a plurality of grid replicas, in which none of the locations of each grid replica overlaps with locations of another grid replica or of the grid, and wherein items located on border locations of each grid replica are in an adjacency relationship along corresponding navigation directions with corresponding items located on border locations of an adjacent grid replica or of the grid, said items on border locations of each grid replica being located in said plane along the corresponding navigation direction at the respective fixed distance from said corresponding items located on border locations of an adjacent grid replica or of the grid.

2. The method of claim 1, wherein said delimited portion has a rhomboidal shape.

3. The method of claim 1, wherein said delimited portion has a hexagonal shape.

4. The method of claim 1, wherein said delimited portion has a "V" shape.

5. The method of claim 1, wherein said navigation directions include:
   a first navigation direction which is parallel to a reference axis contained in the plane;
   a second navigation direction forming an angle of 180 degrees with the reference axis;
   a third navigation direction forming an angle of 135 degrees with the reference axis;
   a fourth navigation direction forming an angle of −135 degrees with the reference axis;
   a fifth navigation direction forming an angle of 45 degrees with the reference axis; and
   a sixth navigation direction forming an angle of −45 degrees with the reference axis.

6. The method of claim 5, wherein:
   along the first or second navigation directions, said fixed distance is equal to a first distance, and
   along the third, fourth, fifth or sixth navigation directions, said fixed distance is equal to a second distance lower than said first distance.

7. The method of claim 1, wherein the locations of the grid are arranged in a sequence of concentric circles starting from an innermost circle to an outermost circle, each circle including a same number of locations.

8. The method of claim 1, wherein the locations of the grid are arranged in a sequence of concentric semi-circles starting from an innermost semi-circle to an outermost semi-circle, each semi-circle including a same number of locations.

9. The method of claim 7, wherein said altering the item-grid arrangement comprises:
   relocating each item previously arranged in a location belonging to each circle or to each semi-circle into an adjacent location of the same circle or semi-circle, so as to rotate clockwise the item-grid arrangement if the received navigation direction is a first direction;
   relocating each item previously arranged in a location belonging to each circle or to each semi-circle into an adjacent location of the same circle or semi-circle, so as to rotate anticlockwise the item-grid arrangement if the received navigation direction is a second direction;
   relocating the items arranged in the locations of each circle or semi-circle into corresponding locations of the next outer circle or semi-circle in the sequence if the received navigation direction is a third direction, the items previously arranged in the outermost circle or semi-circle being instead relocated into corresponding locations of the innermost circle or semi-circle; and
   relocating the items arranged in the locations of each circle or semi-circle into corresponding locations of the next inner circle or semi-circle in the sequence if the received navigation direction is a fourth direction, the items previously arranged in the innermost circle or semi-circle being instead relocated into corresponding locations of the outermost circle or semi-circle.

10. The method of claim 1, wherein said navigation directions include:
    a first navigation direction which is parallel to a reference axis contained in the plane;
    a second navigation direction forming an angle of 180 degrees with the reference axis;
    a third navigation direction forming an angle of 135 degrees with the reference axis;
    a fourth navigation direction forming an angle of −135 degrees with the reference axis;
    a fifth navigation direction forming an angle of 45 degrees with the reference axis; and
    a sixth navigation direction forming an angle of −45 degrees with the reference axis.

* * * * *